US012640010B2

(12) United States Patent
Robards et al.

(10) Patent No.: US 12,640,010 B2
(45) Date of Patent: May 26, 2026

(54) GAMING MACHINE WITH MULTI-STREAM REVOLVING, PERSISTENCE FEATURE

(71) Applicant: LNW Gaming, Inc., Las Vegas, NV (US)

(72) Inventors: Amy Robards, Sparks, NV (US); Kellen Dale, Reno, NV (US); Colbee V. Jones, Reno, NV (US); Keshav Pitani, Reno, NV (US); Dougal Austin, Reno, NV (US); Thomas Allen, Sparks, NV (US)

(73) Assignee: LNW Gaming, Inc., Las Vegas, NV (US)

(*) Notice: Subject to any disclaimer, the term of this patent is extended or adjusted under 35 U.S.C. 154(b) by 328 days.

(21) Appl. No.: 18/180,980

(22) Filed: Mar. 9, 2023

(65) Prior Publication Data

US 2024/0304063 A1 Sep. 12, 2024

(51) Int. Cl.
*G07F 17/32* (2006.01)

(52) U.S. Cl.
CPC ...... *G07F 17/3267* (2013.01); *G07F 17/3213* (2013.01)

(58) Field of Classification Search
CPC .......................... G07F 17/3267; G07F 17/3213
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
(Continued)

FOREIGN PATENT DOCUMENTS

AU 2013251288 A1 5/2014
AU 2014202042 A1 5/2014
(Continued)

OTHER PUBLICATIONS

"Rich Little Piggies—Hog Wild" Game Sheet, Copyright 2021 Scientific Games Corporation.
(Continued)

*Primary Examiner* — Jeffrey K Wong

(57) ABSTRACT

There is provided an example gaming system (and method) to perform operations that include presenting a plurality of reels for a base game. While conducting the base game, the plurality of reels bear a plurality value-bearing symbols, each value-bearing symbol being associated with one of a plurality of tiers for a feature game. The operations further include conducting a series of spins of the plurality of reels for the base game to land randomly selected sets of value-bearing symbols. The operations further include animating persistence of at least some of the randomly selected sets of value-bearing symbols in corresponding tiered, revolving persistence elements presented in a persistence area. The operations further include, in response to determining a random trigger of the feature game, using at least some persisted value-bearing symbols from the persistence area to populate one or more portions of a feature-game array.

20 Claims, 17 Drawing Sheets

(56) References Cited

U.S. PATENT DOCUMENTS

| | | | |
|---|---|---|---|
| 5,342,047 | A | 8/1994 | Heidel et al. |
| 5,356,140 | A | 10/1994 | Dabrowski et al. |
| 5,393,061 | A | 2/1995 | Manship et al. |
| 5,395,111 | A | 3/1995 | Inoue |
| 5,431,408 | A | 7/1995 | Adams |
| 5,511,781 | A | 4/1996 | Wood et al. |
| 5,618,232 | A | 4/1997 | Martin |
| 5,695,188 | A | 12/1997 | Shibashi |
| 5,704,835 | A | 1/1998 | Dietz |
| 5,722,891 | A | 3/1998 | Inoue |
| 5,752,881 | A | 5/1998 | Inoue |
| 5,766,074 | A | 6/1998 | Cannon et al. |
| 5,788,573 | A | 8/1998 | Baerlocher et al. |
| 5,807,177 | A | 9/1998 | Takemoto et al. |
| 5,810,665 | A | 9/1998 | Takemoto et al. |
| 5,833,537 | A | 11/1998 | Barrie |
| 5,848,932 | A | 12/1998 | Adams |
| 5,855,515 | A | 1/1999 | Pease et al. |
| 5,876,284 | A | 3/1999 | Acres et al. |
| 5,882,259 | A | 3/1999 | Holmes, Jr. et al. |
| 5,882,261 | A | 3/1999 | Adams |
| 5,890,962 | A | 4/1999 | Takemoto |
| 5,911,418 | A | 6/1999 | Adams |
| 5,947,820 | A | 9/1999 | Morro et al. |
| 5,951,397 | A | 9/1999 | Dickinson |
| 5,988,638 | A | 11/1999 | Rodesch et al. |
| 6,004,207 | A | 12/1999 | Wilson, Jr. et al. |
| 6,027,115 | A | 2/2000 | Griswold et al. |
| 6,033,307 | A | 3/2000 | Vancura |
| 6,048,269 | A | 4/2000 | Burns et al. |
| 6,050,895 | A | 4/2000 | Luciano, Jr. et al. |
| 6,056,642 | A | 5/2000 | Bennett |
| 6,089,976 | A | 7/2000 | Schneider et al. |
| 6,089,977 | A | 7/2000 | Bennett |
| 6,102,798 | A | 8/2000 | Bennett |
| 6,120,031 | A | 9/2000 | Adams |
| 6,142,873 | A | 11/2000 | Weiss et al. |
| 6,159,097 | A | 12/2000 | Gura |
| 6,162,121 | A | 12/2000 | Morro et al. |
| 6,168,520 | B1 | 1/2001 | Baerlocher et al. |
| 6,186,894 | B1 | 2/2001 | Mayeroff |
| 6,203,429 | B1 | 3/2001 | Demar et al. |
| 6,213,875 | B1 | 4/2001 | Suzuki |
| 6,224,482 | B1 | 5/2001 | Bennett |
| 6,224,483 | B1 | 5/2001 | Mayeroff |
| 6,224,484 | B1 | 5/2001 | Okuda et al. |
| 6,227,971 | B1 | 5/2001 | Weiss |
| 6,241,607 | B1 | 6/2001 | Payne et al. |
| 6,251,013 | B1 | 6/2001 | Bennett |
| 6,270,411 | B1 | 8/2001 | Gura et al. |
| 6,270,412 | B1 | 8/2001 | Crawford et al. |
| 6,290,600 | B1 | 9/2001 | Glasson |
| 6,309,300 | B1 | 10/2001 | Glavich |
| 6,319,124 | B1 | 11/2001 | Baerlocher et al. |
| 6,346,043 | B1 | 2/2002 | Colin et al. |
| 6,364,766 | B1 | 4/2002 | Anderson et al. |
| 6,375,567 | B1 | 4/2002 | Acres |
| 6,375,570 | B1 | 4/2002 | Poole |
| 6,413,162 | B1 | 7/2002 | Baerlocher et al. |
| 6,481,713 | B2 | 11/2002 | Perrie et al. |
| 6,517,432 | B1 | 2/2003 | Jaffe |
| 6,517,433 | B2 | 2/2003 | Loose et al. |
| 6,537,150 | B1 | 3/2003 | Luciano et al. |
| 6,544,120 | B2 | 4/2003 | Ainsworth |
| 6,547,242 | B1 | 4/2003 | Sugiyama et al. |
| 6,551,187 | B1 | 4/2003 | Jaffe |
| 6,554,704 | B2 | 4/2003 | Nicastro et al. |
| 6,558,254 | B2 | 5/2003 | Baelocher et al. |
| 6,561,900 | B1 | 5/2003 | Baerlocher et al. |
| 6,561,904 | B2 | 5/2003 | Locke et al. |
| 6,565,434 | B1 | 5/2003 | Acres |
| 6,641,477 | B1 | 11/2003 | Dietz |
| 6,652,378 | B2 | 11/2003 | Cannon et al. |
| 6,656,040 | B1 | 12/2003 | Brosnan et al. |
| 6,657,923 | B2 | 12/2003 | Laughlin |
| 6,692,356 | B2 | 2/2004 | Baerlocher et al. |
| 6,702,675 | B2 | 3/2004 | Poole et al. |
| 6,731,313 | B1 | 5/2004 | Kaminkow |
| 6,749,502 | B2 | 6/2004 | Baerlocher |
| 6,786,818 | B1 | 9/2004 | Rothschild et al. |
| 6,832,957 | B2 | 12/2004 | Falconer |
| 6,837,790 | B1 | 1/2005 | Kaminkow |
| 6,855,053 | B2 | 2/2005 | Baerlocher |
| 6,869,360 | B2 | 3/2005 | Marks et al. |
| 6,878,061 | B2 | 4/2005 | Baerlocher et al. |
| 6,896,617 | B2 | 5/2005 | Daly |
| 6,910,962 | B2 | 6/2005 | Marks et al. |
| 6,916,243 | B2 | 7/2005 | Yoshida |
| 6,918,834 | B2 | 7/2005 | Vancura |
| 6,921,334 | B1 | 7/2005 | Bennett |
| 6,926,609 | B2 | 8/2005 | Martin |
| 6,960,134 | B2 | 11/2005 | Hartl et al. |
| 6,964,416 | B2 | 11/2005 | Mcclintic et al. |
| 7,018,293 | B2 | 3/2006 | Brown et al. |
| 7,029,395 | B1 | 4/2006 | Baerlocher |
| 7,029,396 | B2 | 4/2006 | Jaffe et al. |
| 7,065,215 | B2 | 6/2006 | Shirakawa et al. |
| 7,112,136 | B2 | 9/2006 | Anderson et al. |
| 7,121,945 | B2 | 10/2006 | Suganuma et al. |
| 7,137,886 | B2 | 11/2006 | Locke et al. |
| 7,147,559 | B2 | 12/2006 | Englman |
| 7,156,740 | B2 | 1/2007 | Kaminkow |
| 7,179,169 | B2 | 2/2007 | Beaulieu et al. |
| 7,252,591 | B2 | 8/2007 | Van Asdale |
| 7,294,055 | B2 | 11/2007 | Baerlocher et al. |
| 7,316,613 | B2 | 1/2008 | Luccesi et al. |
| 7,371,170 | B2 | 5/2008 | Cregan et al. |
| 7,377,850 | B2 | 5/2008 | Shackelford et al. |
| 7,431,646 | B2 | 10/2008 | Jackson |
| 7,452,276 | B2 | 11/2008 | Loose et al. |
| 7,458,890 | B2 | 12/2008 | Loose et al. |
| 7,488,252 | B2 | 2/2009 | Griswold et al. |
| 7,494,412 | B2 | 2/2009 | Baerlocher |
| 7,503,847 | B2 | 3/2009 | Baerlocher |
| 7,526,736 | B2 | 4/2009 | Kaminkow et al. |
| 7,553,231 | B2 | 6/2009 | Rodgers et al. |
| 7,578,735 | B2 | 8/2009 | Frizzell et al. |
| 7,601,062 | B2 | 10/2009 | Cole et al. |
| 7,604,538 | B2 | 10/2009 | Pacey |
| 7,618,319 | B2 | 11/2009 | Casey et al. |
| 7,625,278 | B2 | 12/2009 | Paulsen et al. |
| 7,628,690 | B2 | 12/2009 | Englman et al. |
| 7,631,872 | B2 | 12/2009 | Roemer et al. |
| 7,654,895 | B2 | 2/2010 | Pacey |
| 7,654,899 | B2 | 2/2010 | Durham et al. |
| 7,699,699 | B2 | 4/2010 | Gilliland et al. |
| 7,704,141 | B1 | 4/2010 | Marks et al. |
| 7,744,460 | B2 | 6/2010 | Walker et al. |
| 7,785,191 | B2 | 8/2010 | Marks et al. |
| 7,789,744 | B2 | 9/2010 | Fiden |
| 7,841,934 | B2 | 11/2010 | Gauselmann |
| 7,980,936 | B2 | 7/2011 | Mead |
| 8,021,223 | B2 | 9/2011 | Rose |
| 8,021,225 | B2 | 9/2011 | Okada |
| 8,057,303 | B2 | 11/2011 | Rasmussen et al. |
| 8,066,563 | B1 | 11/2011 | Schultz et al. |
| 8,083,581 | B2 | 12/2011 | Marks et al. |
| 8,105,145 | B2 | 1/2012 | Jaffe |
| 8,105,151 | B2 | 1/2012 | Caputo et al. |
| 8,113,940 | B2 | 2/2012 | Hornik |
| 8,147,322 | B2 | 4/2012 | Walker et al. |
| 8,162,740 | B2 | 4/2012 | Aoki |
| 8,162,741 | B2 | 4/2012 | Wadleigh et al. |
| 8,192,275 | B2 | 6/2012 | Aoki et al. |
| 8,226,459 | B2 | 7/2012 | Barrett et al. |
| 8,246,442 | B1 | 8/2012 | Barrie |
| 8,272,938 | B2 | 9/2012 | Gilmore et al. |
| 8,287,357 | B2 | 10/2012 | Evans |
| 8,323,091 | B2 | 12/2012 | Frank et al. |
| 8,357,041 | B1 | 1/2013 | Saunders |
| 8,360,851 | B2 | 1/2013 | Aoki et al. |
| 8,366,538 | B1 | 2/2013 | Saunders et al. |
| 8,371,930 | B1 | 2/2013 | Saunders et al. |
| 8,388,432 | B2 | 3/2013 | Mattice et al. |

(56) References Cited

U.S. PATENT DOCUMENTS 8,414,380 B2 4/2013 Saunders et al.
8,465,358 B2 6/2013 Kemper
8,480,473 B2 7/2013 Villejo et al.
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,591,330 B2 11/2013 Kelly et al.
8,602,868 B2 12/2013 Johnson et al.
8,608,545 B2 12/2013 Arora et al.
8,662,986 B2 3/2014 Rodgers et al.
8,678,908 B2 3/2014 Nicely
8,690,660 B2 4/2014 Saunders et al.
8,696,434 B2 4/2014 Tsukahara
8,702,487 B2 4/2014 Thomas
8,771,054 B2 7/2014 Aoki et al.
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,552,693 B1 * 1/2017 Reeves ............... G07F 17/3239
9,595,157 B2 3/2017 Rasmussen et al.
9,633,506 B2 4/2017 Basallo et al.
9,704,342 B2 7/2017 Aoki et al.
9,928,691 B2 3/2018 Olive
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0009865 A1 * 7/2001 Demar .................... G07F 17/32
463/20
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0013531 A1 * 1/2003 Rowe .................. G07F 17/3248
463/42
2003/0017865 A1 1/2003 Beaulieu et al.
2003/0027619 A1 2/2003 Nicastro, Sr.
2003/0035346 A1 2/2003 Laughlin
2003/0050111 A1 * 3/2003 Saffari ................ G07F 17/3255
463/25
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Loose et al.
2003/0216165 A1 11/2003 Singer et al.
2004/0012145 A1 1/2004 Inoue
2004/0023714 A1 2/2004 Asdale
2004/0038733 A1 * 2/2004 Walker ................ G07F 17/3244
463/25
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0057464 A1 * 3/2007 Cockrell, Jr. ............. A63F 1/00
273/303
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0146346 A1 * 6/2008 Hardy ................... G07F 17/329
463/16
2008/0182647 A1 7/2008 Brunet De Courssou et al.
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth

(56) References Cited

U.S. PATENT DOCUMENTS

| | | | | |
|---|---|---|---|---|
| 2011/0009197 | A1* | 1/2011 | Peltz | G07F 17/3246 463/46 |
| 2011/0244943 | A1 | 10/2011 | Milford et al. | |
| 2011/0300937 | A1 | 12/2011 | Crowder, Jr. et al. | |
| 2012/0015707 | A1 | 1/2012 | Hornik et al. | |
| 2012/0034965 | A1 | 2/2012 | Masen et al. | |
| 2012/0064961 | A1* | 3/2012 | Vancura | G07F 17/3265 463/20 |
| 2012/0077564 | A1 | 3/2012 | Collette et al. | |
| 2012/0094738 | A1 | 4/2012 | Aoki et al. | |
| 2012/0122532 | A1 | 5/2012 | Berman et al. | |
| 2012/0178517 | A1 | 7/2012 | Montenegro et al. | |
| 2012/0220360 | A1 | 8/2012 | Mcallister et al. | |
| 2013/0053124 | A1 | 2/2013 | Masen et al. | |
| 2013/0065663 | A1 | 3/2013 | Johnson et al. | |
| 2013/0102375 | A1 | 4/2013 | Aoki et al. | |
| 2013/0252704 | A1 | 9/2013 | Gilbertson et al. | |
| 2013/0260861 | A1 | 10/2013 | Vann et al. | |
| 2013/0324217 | A1 | 12/2013 | Gilbertson et al. | |
| 2014/0014186 | A1 | 1/2014 | Bhattacharya et al. | |
| 2014/0024429 | A1 | 1/2014 | Aoki et al. | |
| 2014/0051496 | A1 | 2/2014 | Meyer | |
| 2014/0141860 | A1 | 5/2014 | Meyer | |
| 2014/0179396 | A1 | 6/2014 | Aoki et al. | |
| 2014/0274292 | A1 | 9/2014 | Suda | |
| 2014/0323198 | A1 | 10/2014 | Tuck | |
| 2015/0031437 | A1 | 1/2015 | Gomez et al. | |
| 2015/0170462 | A1 | 6/2015 | Berman et al. | |
| 2015/0206386 | A1 | 7/2015 | Jaffe et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2015/0379831 | A1 | 12/2015 | Lee et al. | |
| 2016/0042597 | A1 | 2/2016 | Olive | |
| 2016/0155303 | A1 | 6/2016 | Aoki et al. | |
| 2016/0358424 | A1* | 12/2016 | Thomas | G07F 17/3272 |
| 2017/0092059 | A1* | 3/2017 | Nelson | G07F 17/3225 |
| 2017/0154498 | A1 | 6/2017 | Olive | |
| 2017/0372558 | A1 | 12/2017 | You et al. | |
| 2018/0130303 | A1 | 5/2018 | Lamb | |
| 2018/0268655 | A1 | 9/2018 | Olive | |
| 2018/0268659 | A1 | 9/2018 | Chesworth et al. | |
| 2019/0051097 | A1 | 2/2019 | Marks et al. | |
| 2019/0102992 | A1 | 4/2019 | You et al. | |
| 2019/0236905 | A1 | 8/2019 | Washington et al. | |
| 2021/0082248 | A1* | 3/2021 | Guerrero | G07F 17/3213 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

OTHER PUBLICATIONS

"Epic Win on Bao Zhu Zhao Fu Slot Machine," YouTube.com, https://www.youtube.com/watch?v=D-KSp5hqnQs, Uploaded by Slot Machine Wins by CHICO on Feb. 27, 2022, accessed on Feb. 22, 2023, citing time stamps at "0:09," "0:34," "0:41," "0:45," "0:56," "4:37," "4:46," "4:48," "5:23," and "5:27."

* cited by examiner

GAMING MACHINE WITH MULTI-STREAM REVOLVING, PERSISTENCE FEATURE

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods thereon and, more particularly, to new and improved animations in connection with a bonus game feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

According to an embodiment of the present disclosure, there is provided a gaming system, gaming machine, and method that utilizes a presentation assembly configured to present a plurality of symbol-bearing base-game reels that form a base-game array and to conduct a base game. While conducting the base game, the plurality of reels bear a plurality of base-game symbols and a plurality of value-bearing symbols. Each value-bearing symbol is associated with one of a plurality of tiers for a feature game. The base game includes operations that include conducting a series of spins of the plurality of reels, each spin including spinning and stopping the plurality of reels to randomly land at least some of the plurality of base-game symbols in the base-game array. The series of spins also lands randomly selected sets of value-bearing symbols from the plurality of value-bearing symbols. The operations of the base game further include animating persistence of at least some of the randomly selected sets of value-bearing symbols in corresponding ones of a plurality of tiered, revolving persistence elements presented in a feature-game persistence area. Each of the plurality of tiered, revolving persistence elements corresponds to a respective one of the plurality of tiers. The gaming system, gaming machine, and/or method determines a random trigger to present play of the feature game; and in response to determining the trigger, uses at least some persisted value-bearing symbols from the persistence area to populate one or more portions of a feature-game array.

Additional aspects of the invention will be apparent to those of ordinary skill in the art in view of the detailed description of various embodiments, which is made with reference to the drawings, a brief description of which is provided below.

Figure 1:
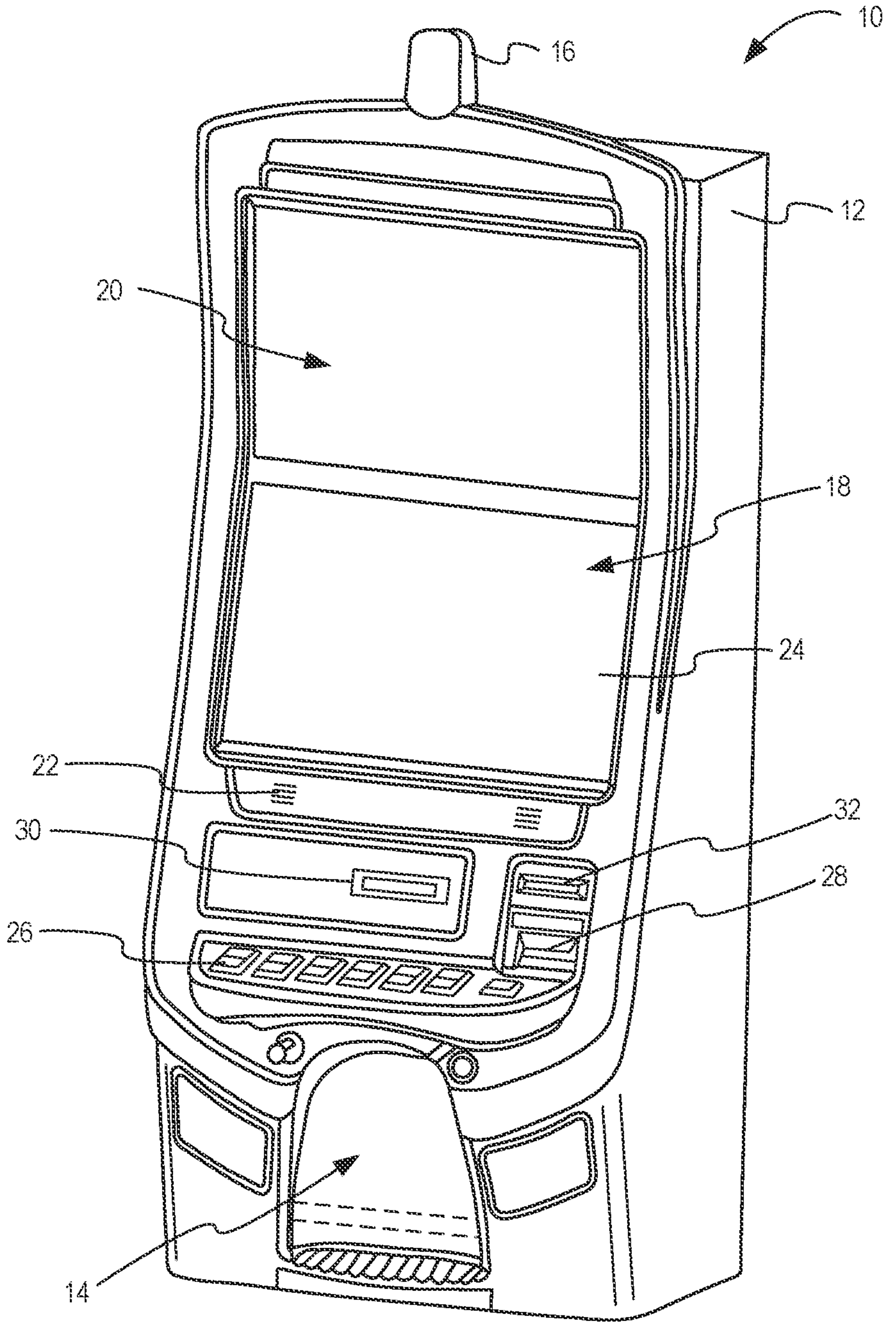
FIG. 1 is a perspective view of a free-standing gaming machine according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical-reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIGS. 6-17). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the credits meter (e.g., credit meter 200, see FIGS. 6-17), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
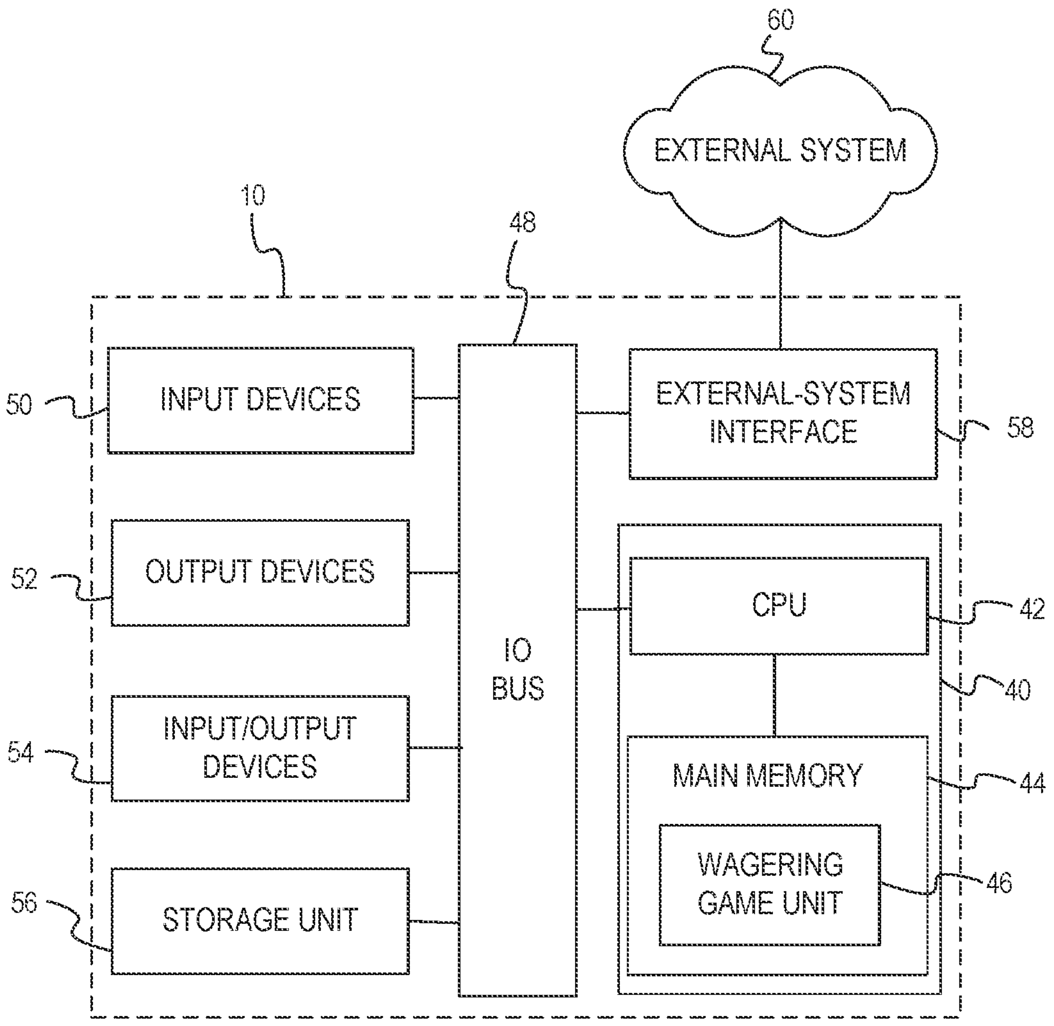
FIG. 2 is a block diagram of a gaming system according to an embodiment of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry 40 facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be implemented with hardware and software architectures, circuitry, and other special features that differentiate it from general-purpose computers (e.g., desktop PCs, laptops, and tablets).

Figure 3:
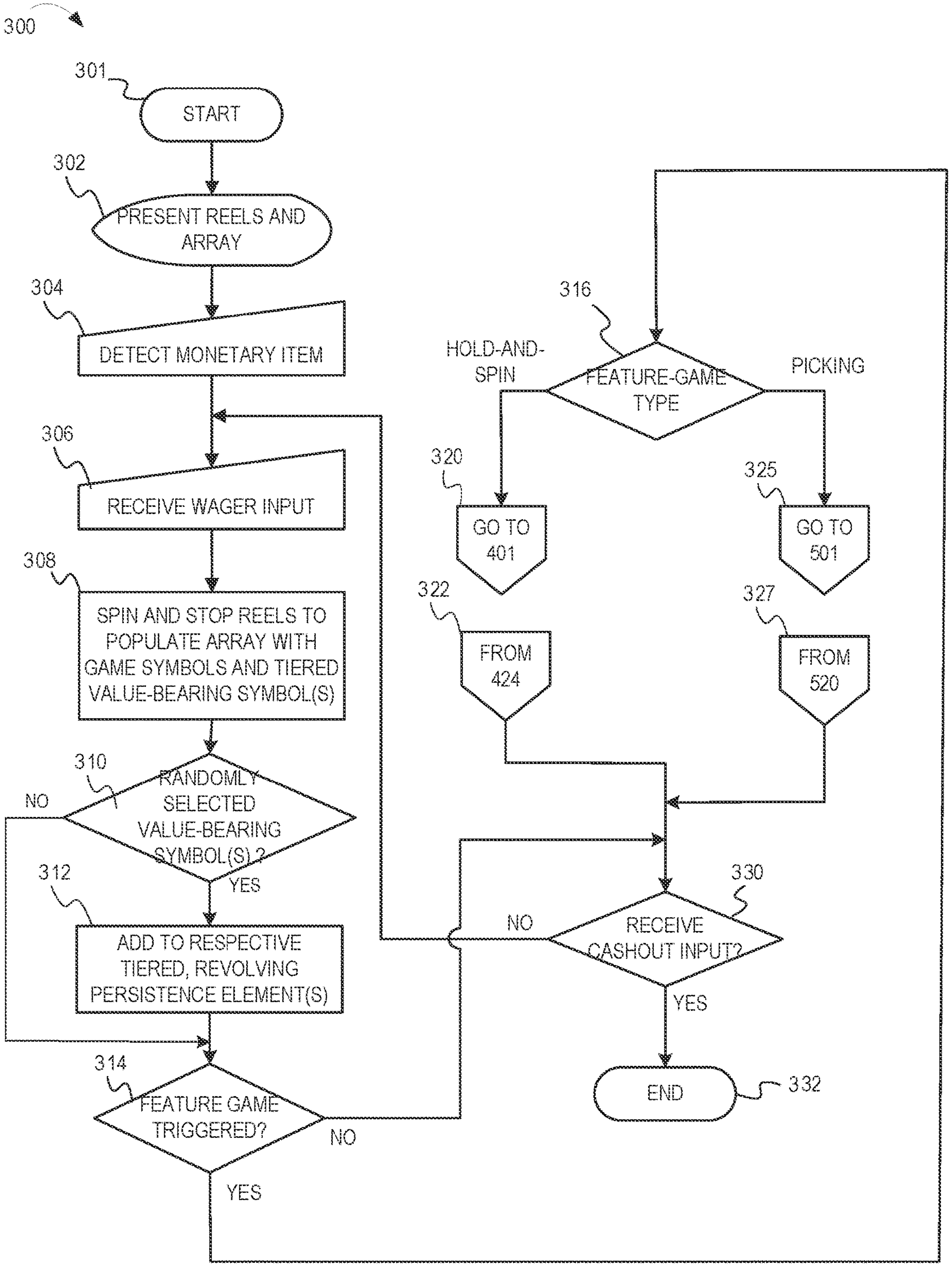
FIG. 3 is a flow diagram for a data processing method that corresponds to instructions executed by game-logic circuitry, according to an embodiment of the present disclosure.

Referring now to FIG. 3, there is shown a flowchart representing one data processing method corresponding to at least some instructions stored and executed by the game-logic circuitry 40 in FIG. 2 to perform operations according to an embodiment of the present disclosure. The data processing method is described below in connection with an exemplary representation of a series of feature game cycles (including presentation of the game cycle/spin outcomes) in FIGS. 6-11.

The data processing method follows a flow 300, which commences at processing block 301. The flow 300 continues at processing block 302, where game-logic circuitry controls one or more presentation devices (e.g., mechanical-reel display device, video display device, or a combination thereof) that presents a plurality of symbol-bearing reels and an array of symbol positions. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. The number of symbol positions in different rows and/or different columns may vary from each other. The reels may be associated with the respective columns of the array such that the reels spin vertically and each reel populates a respective column. In another embodiment, the reels may be associated with the respective rows of the array such that the reels spin horizontally and each reel populates a respective row. In yet another embodiment, the reels may be associated with respective individual symbol positions of the array such that each reel populates only its respective symbol position.

Figure 6:
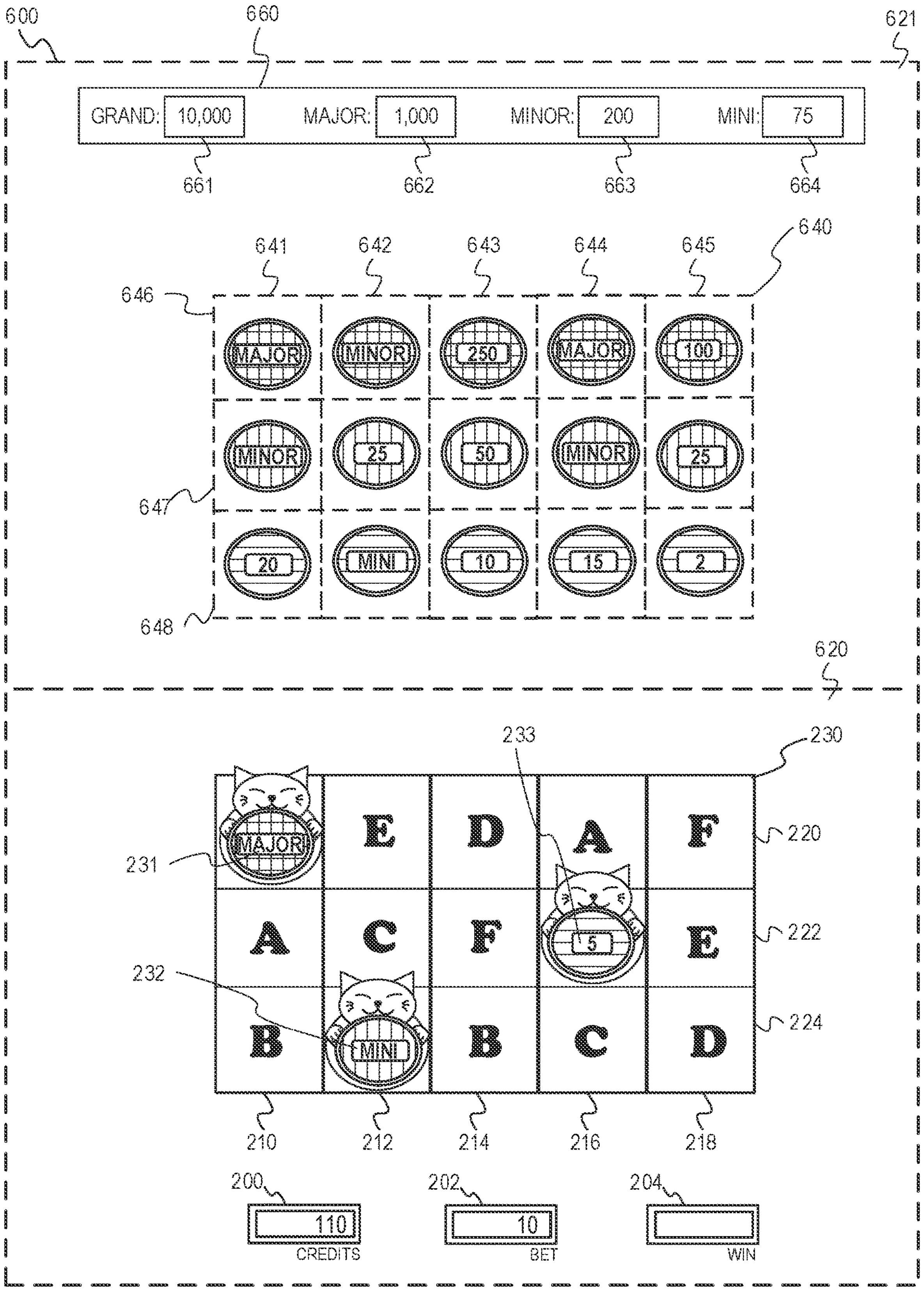
FIGS. 6-11 are an exemplary representation of a series of game cycle events and/or outcomes (e.g. spin outcomes) for a hold-and-spin feature according to an embodiment of the present disclosure.
Figure 7:
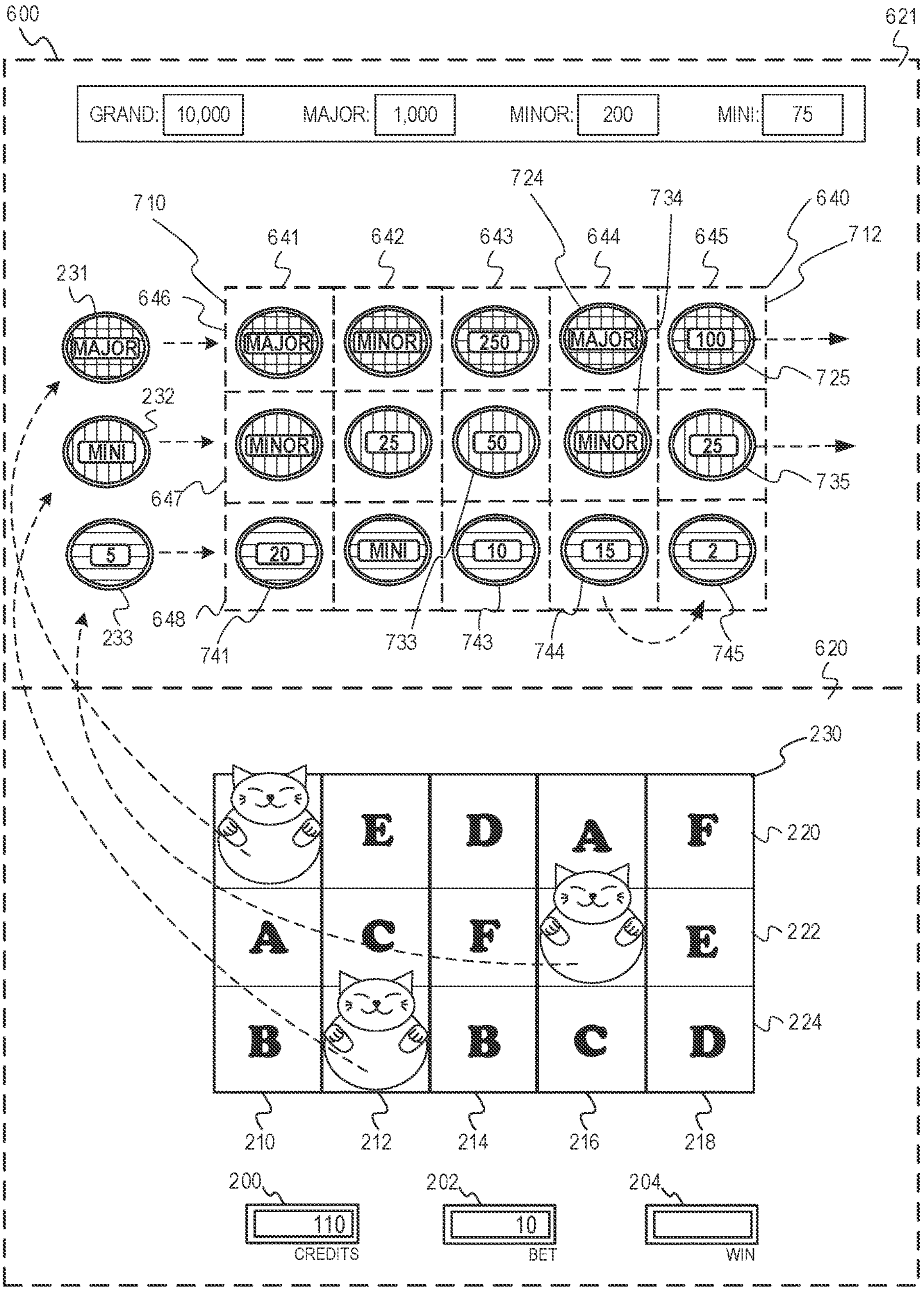

In the example shown in FIG. 6, the presentation device (e.g., presentation device(s) 600) presents (on a primary presentation device 620) a three-by-five array 230 comprising three rows 220, 222, 224 and five columns 210, 212, 214, 216, 218. Each column is associated with a respective reel such that the reel populates the three symbol positions in the associated column. The reels bear a plurality of symbols. In one embodiment, the plurality of symbols include standard symbols (e.g., A, B, C. D. E, and F) and tiered value-bearing symbols (e.g., tiered value-bearing symbols 231, 232, and 233). The standard symbols are used during base-game spins to determine outcomes of the base game. Each tiered value-bearing symbol is associated with a credit or currency value indicated on the symbol itself. The value on a particular one of the tiered value-bearing symbols may be fixed or variable (e.g., random) from one game cycle to the next. Different tiered value-bearing symbols on the reels may have different values. Each reel may contain one or more stacks (i.e., clumps) of tiered value-bearing symbols that appear adjacent to each other along the reel. The values of the tiered value-bearing symbols in any given stack may be the same or different. A stack of tiered value-bearing symbols may consist of two, three, four, or more adjacent symbols. In some embodiments, the tiered value-bearing symbols may appear only on specific portions of the array 230. Furthermore, in one embodiment, each of the tiered value-bearing symbols is associated with one of a plurality of different tiers. The tiers represent different ranges of credit values presented on the tiered value-bearing symbols. In other words, each tiered value-bearing symbol has a tiered characteristic, which is indicated by a tier indicator (e.g., a specific color, style, size, text description, special effect, etc.), which tier indicator represents a range of credit (or other award) value within a hierarchy of possible values. The ranges of the values may be associated with a pay table, or other information, such as rules or instructions presented regarding the feature game. In one example, colors are used to distinguish the tiers. For instance, GOLD colored value-bearing symbols (e.g., tiered value-bearing symbol 231) have a highest tier of value (i.e., are the most valuable, or have the highest range of credit values). RED colored value-bearing symbols (e.g., tiered value-bearing symbol 232) have a middle tier of value (i.e., have a range of values lower than that of GOLD, but higher than that of GREEN). GREEN value-bearing symbols (e.g., tiered value-bearing symbol 233) have the lowest tier of value. In one embodiment, the game-logic circuitry uses the tiered indicator, for instance, to match randomly selected ones of the tiered value-bearing symbols with corresponding tiered, revolving persistence elements (e.g., queues, pots, banks, containers, etc.) presented within a persistence area 640 (e.g., see FIG. 6 and processing block 312 for more detail). The persistence area 640 may also be referred to herein as a cash-box top, which is presented via a secondary presentation device 621.

Returning to FIG. 3, the flow 300 continues at processing block 304, where the game-logic circuitry detects, via a value input device, a physical item associated with a monetary value that establishes a credit balance. As shown in FIGS. 6-17, the credit balance may be shown on the credit meter 200 of the gaming machine.

The flow 300 continues at processing block 306, where the game-logic circuitry initiates a wagering game cycle in response to an input indicative of a wager covered by the credit balance. To initiate a spin of the reels, the player may press a "Spin" or "Max Bet" key on a button panel or touch screen. As shown in FIGS. 6-17, the wager may be shown on a bet meter 202.

The flow 300 continues, at processing block 308, where, using an RNG, the game-logic circuitry spins and stops the reels to randomly land standard and/or tiered value-bearing symbols from the reels in the array 230 in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. The reel spin may land the standard symbols and/or the tiered value-bearing symbols (e.g., as presented in the array 230 shown in FIG. 6).

The flow 300 continues at processing block 310, where, using an RNG, the game-logic circuitry 310 determines whether to randomly select any of the landed tiered value-bearing symbols (which are presented on the reels) for persistence (e.g., for inclusion in persistence area 640, to persist across the series of spins of the base game until the feature-game is triggered (at processing block 314)). As described, in one embodiment, the game-logic circuitry randomly generates the tiered value-bearing symbols (e.g., at processing block 308) for presentation on the reels, and then randomly determines whether to persist any of those randomly generated, tiered value-bearing symbols (e.g., at processing block 310). However, in other embodiments, the game-logic circuitry can instead determine that any randomly generated, tiered value-bearing symbol that is presented on the reels is automatically selected for persistence. If, at processing block 310, the game-logic circuitry determines that one or more tiered value-bearing symbols are selected for persistence, the flow 300 continues at processing block 312. Otherwise, the flow 300 continues at processing block 314.

Game-circuitry logic can randomly generate (e.g., for presentation on the reels 210, 212, 214, 216, and/or 218) and/or randomly select (e.g., for selection as a persisted value-bearing symbols) the tiered value bearing symbols according to odds of occurrence that correspond to the tier level. For example, GOLD tiered value-bearing symbols have the highest range of credit values, thus the odds of generating and/or selecting a GOLD tiered value-bearing symbol for persistence is less than that of RED or GREEN tiered value-bearing symbols. Likewise, given that RED tiered value-bearing symbols have the second highest range of credit values (i.e., the middle tier) in the tier hierarchy, the odds of generating and/or selecting a RED tiered value-bearing symbol for persistence is more than that of GOLD tiered value-bearing symbols, but less than that of a GREEN tiered value-bearing symbol. Further, given that the GREEN tiered value-bearing symbols have the lowest range of credit values, the odds of generating and/or selecting a GREEN tiered value-bearing symbol for persistence is more than that of GOLD or RED tiered value-bearing symbols.

The flow 300 continues at processing block 312, where the game-logic circuitry adds any of the randomly selected tiered value-bearing symbols to corresponding tiered, revolving-persistence elements. As shown in FIG. 6, one example of tiered, revolving persistence elements includes tiered first-in-first-out (FIFO) queues, presented as rows of a same tier of persisted value-bearing symbols (i.e., any value-bearing symbol persisted within the persistence area 640 may be referred to as a persisted value-bearing symbol). As illustrated, the persisted value-bearing symbols are matched (by the tiered characteristic, such as a color) to a respective tiered persistence element based on the tier of a hierarchy of values or value ranges. For example, GOLD tiered value-bearing symbols have a highest tier of value (e.g., are the most valuable), and thus are grouped into a first persistence element (e.g., first queue 646) associated with the GOLD tier (i.e., the highest tier); RED tiered value-bearing symbols are grouped into a second persistence element (e.g., second queue 647) associated with the RED tier (i.e., the middle tier); GREEN tiered value-bearing symbols are grouped into a third persistence element (e.g., third queue 648) associated with the GREEN tier (i.e., the lowest tier).

The persisted value-bearing symbols may or may not be color-matched to their respective tiered persistence elements, provided their association to a tiered persistence element is indicated in another way, such as by an informational grouping (e.g., the same-tiered, persisted value-bearing symbols are grouped together into a specific area, physical arrangement, pattern, shape, etc.). Furthermore, a tiered persistence element may have a visible outline or border (e.g., the persistence element may be an animated "pot" or "bank" having a depicted outline), or the borders of the persistence element may be non-visible (e.g., having a non-visible border, but a visible structure, such as rows and/or columns). The game-logic circuitry can animate tiered persistence elements to have a grouped structure such that the boundary can deduced based on the location or nature of the grouping and/or based on relative placement to other groupings of a different tier. For instance, as depicted in FIG. 6-11, the tiered persistence elements are illustrated as queues that form rows of a rectangular grid or array, where each queue/row is a different tiered grouping within the persistence area 640 (e.g., GOLD tiered value-bearing symbols are on a top row (in queue 646) of the persistence area 640, RED tiered value-bearing symbols are on a middle row 647 (in queue 647) of the persistence area, and GREEN tiered value-bearing symbols are presented on a bottom row (in queue 648) of the persistence area 640).

Referring to FIG. 6, the persistence area 640 is rectangular in shape, and is presented on the secondary presentation device 621, however other embodiments may utilize other shapes (e.g., an oval shape, curved rows, etc.). Also presented on the secondary presentation device 621 is a table 660 related to progressive jackpots associated with the feature game. For example, a highest level of progressive jackpot is the "GRAND" level (e.g., whose current jackpot value is shown in meter 661). The GRAND progressive is won by accomplishing a black-out state for a hold-and-spin feature game (e.g., see processing block 416 in FIG. 4). A second level of progressive jackpot is the "MAJOR" level, which is less than the GRAND level. The jackpot value for the MAJOR level is presented in meter 662. A third level of progressive jackpot is the "MINOR" level, which is less than the MAJOR level. The jackpot value for the MINOR level is presented in meter 663. A fourth level of progressive jackpot is the "MINI" level, which is less than the MINOR level. The jackpot value for the MINI level is presented in meter 664. The MAJOR, MINOR, and/or MINI levels are won if a tiered value-bearing symbol is locked into the feature-game array for a hold-and-spin feature game (e.g., see processing block 418). The progressive jackpot levels are randomly selected (for presentation on the tiered value-bearing symbols) based on odds associated with the tier levels. For instance, the MAJOR level may be randomly selected (for presentation on a tiered value-bearing symbol) based on odds of occurrence for the highest tier (e.g., for presentation on GOLD tiered value-bearing symbols only). The MAJOR and MINOR levels may be randomly selected (for presentation on a value-bearing symbol) based on odds of occurrence for the middle tier (e.g., for presentation on RED tiered value-bearing symbols). The MINI level may be randomly selected (for presentation on a value-bearing symbol) based on odds of occurrence for the lowest tier (e.g., for presentation on GREEN tiered value-bearing symbols).

Figure 8:
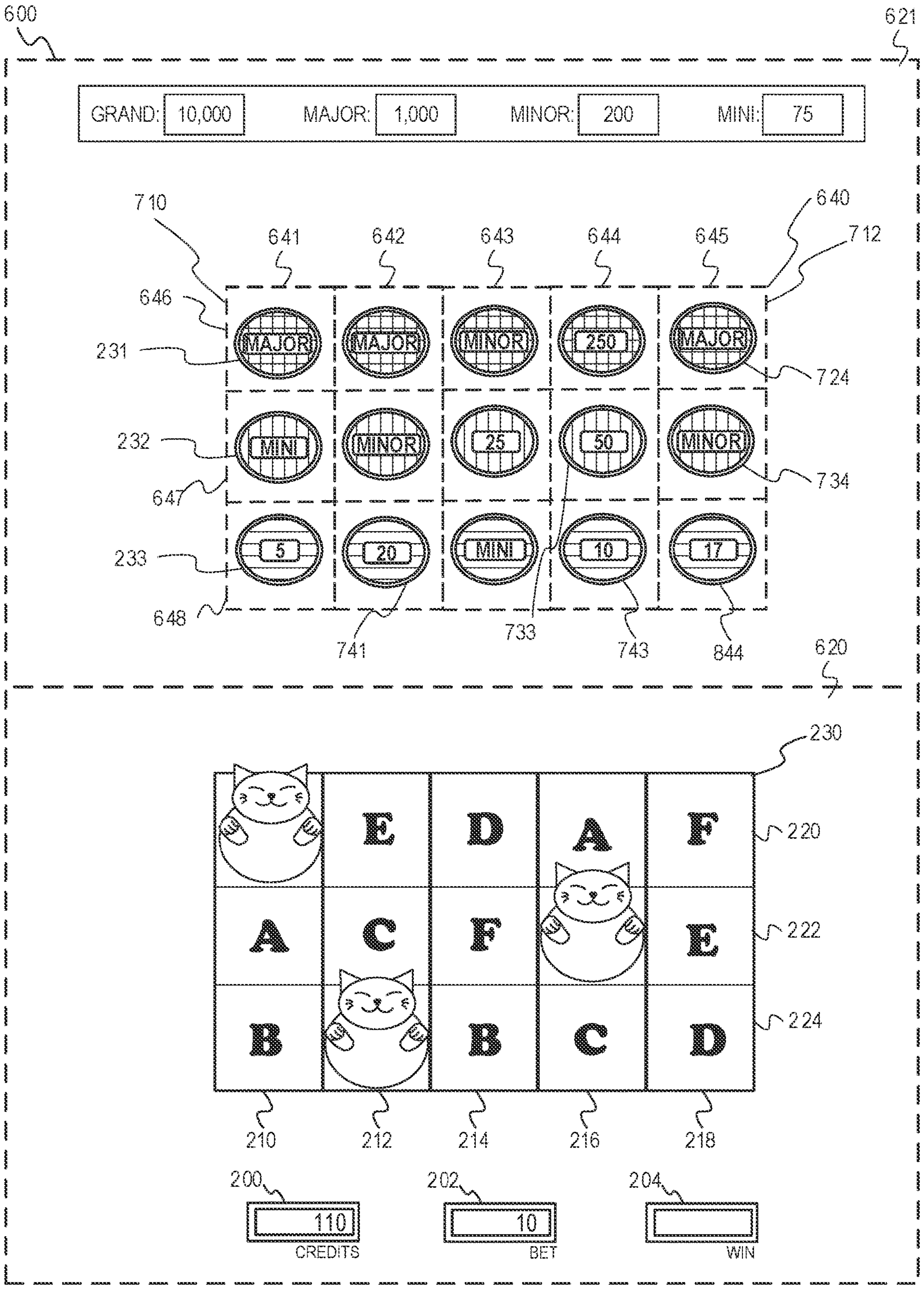

As mentioned, the tiered, revolving persistence elements may be tiered first-in-first-out queues which animate inclusion of a tiered value-bearing symbol into a responsive traveling effect (or revolving "stream" effect) of persisted elements that enter one side of the tiered persistence element and, via the traveling effect, cause a last element of the queue to either leave the persistence area, or be merged into another persisted value-bearing symbol. For example, referring to FIG. 7, each of the tiered value-bearing symbols 231, 232, and 233 are randomly selected for persistence. Hence, the game-logic circuitry animates a movement effect where the tiered value-bearing symbols 231, 232, and 233 move (e.g., "fly") to a first side 710 of each respective tiered persistence element (i.e. to each of the respective queues 646, 647, and 648). The tiered value-bearing symbols 231, 232, and 233 then enter the queues 646, 647, and 648 to replace the positions of persisted value-bearing symbols within the column 641. In other words, a selected value-bearing symbol flies to the first side 710 and causes the already persisted value-bearing symbols within the queue to move by one position to the right (e.g., from column to column). Hence, the persisted value-bearing symbols that were already in column 641 move to column 642 to accommodate the newly added value-bearing symbols 231, 232, and 233. Likewise, the persisted value-bearing symbols that were already in column 642 move to column 643; the persisted value-bearing symbols already in column 643 move to column 644; and the persisted value-bearing symbols already in column 644 move to column 645. The persisted value-bearing symbols already in column 645 (e.g., adjacent to an edge or border of a second side 712 opposite to the first side 710) can, in one embodiment, move out of their respective queues (e.g., value bearing symbol 725 and 735 leave the persistence area from the second side 712). When the persisted value-bearing symbols 725 and 735 leave their respective queues, they disappear, and are replaced in column 645 by value-bearing symbols 724 and 734 respectively (which have traveled according to the animated movement of the travel effect). In another embodiment, a value-bearing symbol already in column 645 can be merged with another value-bearing symbol. For example, as illustrated in FIG. 8, the value-bearing symbol 745 has merged (in value) with that of the oncoming value-bearing symbol 744, forming a new value-bearing symbol 844 (see FIG. 8). For example, the value-bearing symbol 744 bears "15" credits and the value-bearing symbol 745 bears "2" credits, which values are merged together (e.g., added together) into the single value-bearing symbol 844 having "17" credits. FIG. 8 illustrates the state of the persistence area 640 after the moving effect and the travel effect. The value-bearing symbols 231, 232, and 233 are now in their first positions (i.e., in column 641) of the respective queues 646, 647, and 648. Furthermore, the already persisted value-bearing symbols within the persistence area 640 are now in their revolved states (i.e., moved one position to the right). As described, the merged value-bearing symbol 844 is positioned in column 645 and has the combined value of "17" credits, and the value-bearing symbols 725 and 735 have disappeared from the persistence arca 640.

Referring again to FIG. 3, at processing block 314, the game-logic circuitry determines whether the feature game is triggered. For example, the game-logic circuitry can determine whether or not the feature game is triggered by a random mystery trigger (e.g., via the RNG). In one embodiment, the trigger can be based on whether a specific catalyst occurs, such as whether a certain number (e.g., at least one) of the tiered value-bearing symbols are generated to appear on the reels and/or based on a certain number of tiered value-bearing symbols randomly selected for persistence.

If, at processing block 314, the feature game is not triggered, the game-logic circuitry immediately proceeds to processing block 330. If, however, the feature game is triggered, the game-logic circuitry proceeds to processing block 316 where the game-logic circuitry determines, based on the trigger type, whether to present a hold-and-spin feature game that includes a series of bonus spins (also referred to as bonus/feature games, bonus/feature game cycles, or bonus/feature game events), or whether to present a picking feature game. If the hold-and-spin feature game is triggered, then the flow 300 continues, at processing block 320, to processing block 401 of flow 400 (see FIG. 4). The flow 400 returns from processing block 424 to flow 300 at processing block 322. If, however, at processing block 316, the game-logic circuitry determines that the picking feature game was triggered, then the flow 300 continues, at processing block 325, to processing block 501 of flow 500 (see FIG. 5). The flow 500 returns from processing block 520 to flow 300 at processing block 327. For either type of feature game, the game logic circuitry presents feature game play using at least some persisted value-bearing symbols to populate one or more portions of a feature-game array. After conducting the feature game, the flow 300 proceeds to processing block 330, wherein the game-logic circuitry determines whether a cashout input has been received. If a cashout input is received, then the flow 300 ends at processing block 332. If a cashout input is not received, the flow 300 returns to processing block 306 to await an additional wager input for the base game.

Figure 4:
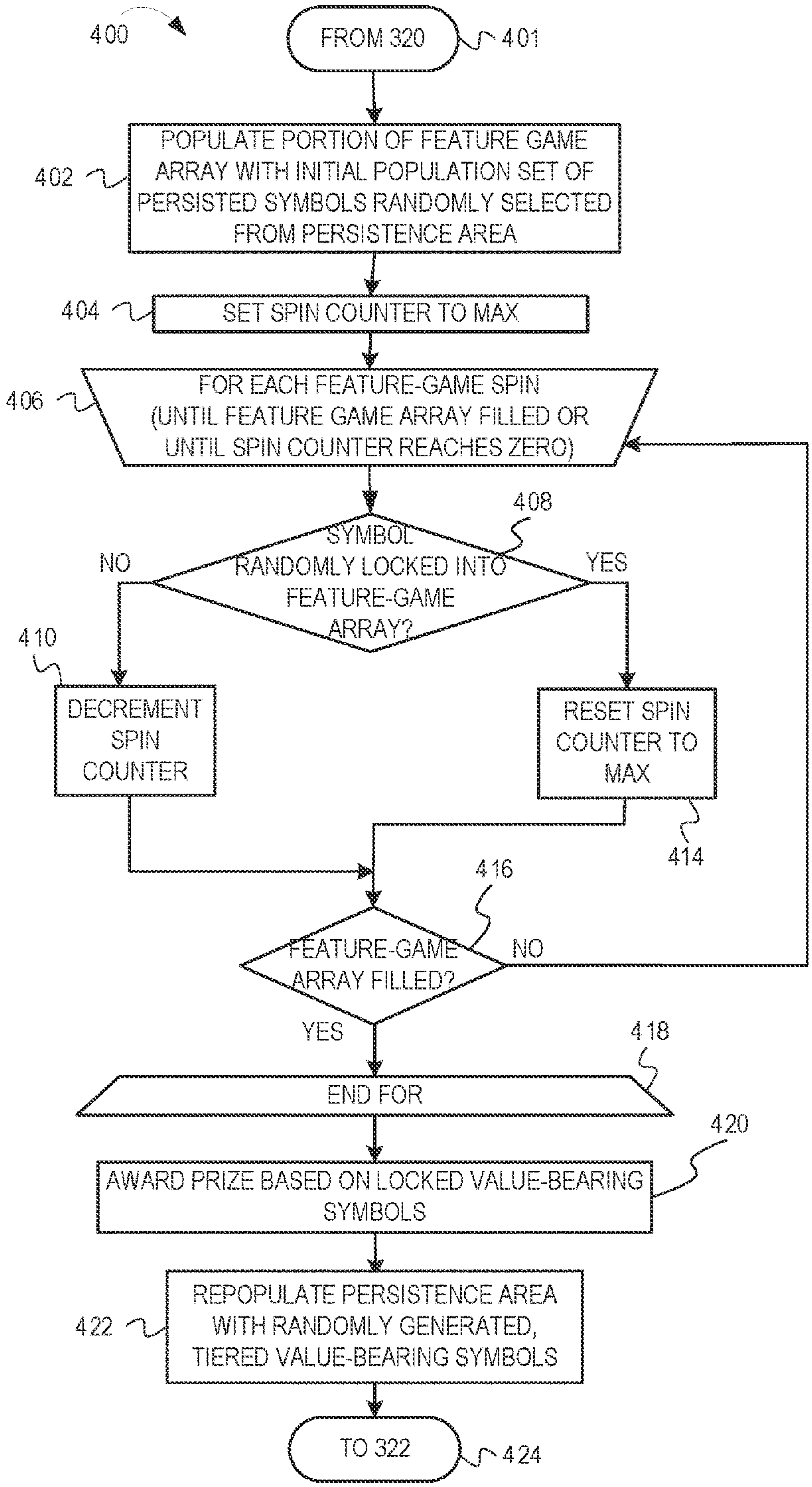
FIG. 4 is a flow diagram for a data processing method that corresponds to instructions executed by game-logic circuitry, according to an embodiment of the present disclosure.
Figure 5:
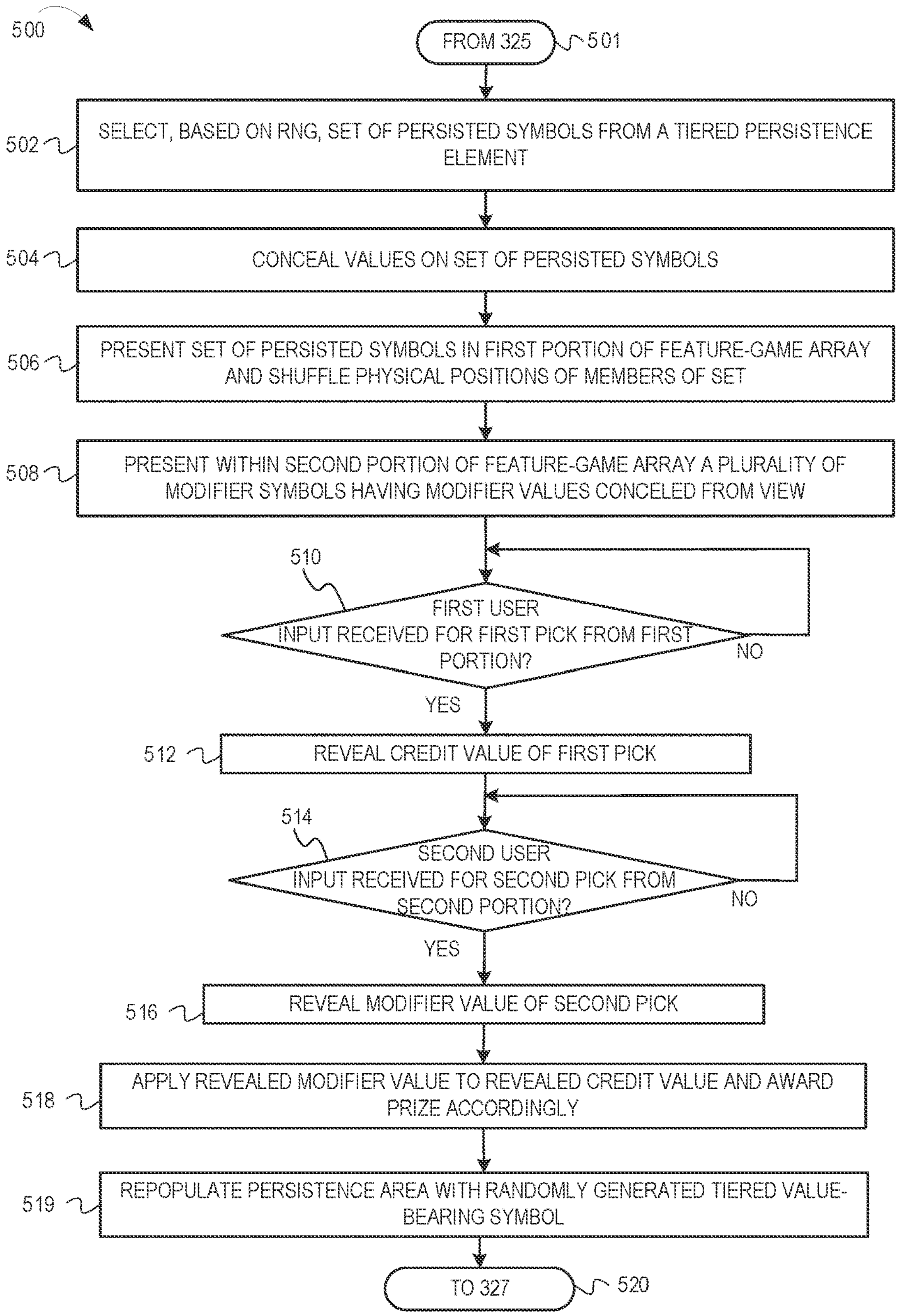
FIG. 5 is a flow diagram for a data processing method that corresponds to instructions executed by game-logic circuitry, according to an embodiment of the present disclosure.
Figure 9:
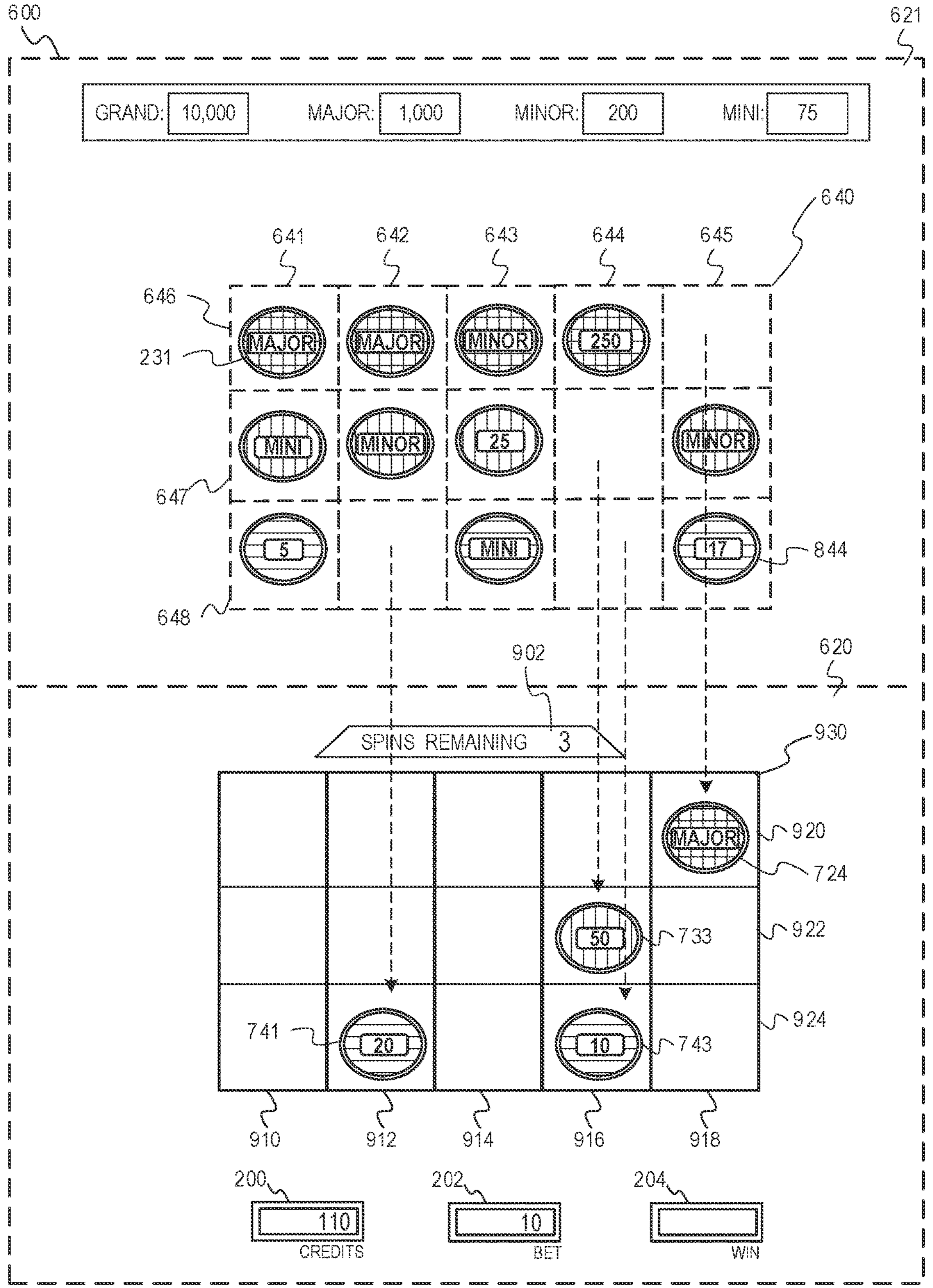

This description will first describe details of the hold-and-spin feature game (i.e., FIG. 4), then will describe details of the picking feature game (i.e., FIG. 5). Referring to FIG. 4, flow 400 begins at processing block 401 (i.e., from processing block 320), then continues to processing block 402, where the game-logic circuitry populates a portion of a feature-game array with an initial population set of persisted value-bearing symbols randomly selected from the persistence area. For example, referring to FIG. 9, the game-logic circuitry randomly selects some of the persisted value-bearing symbols in the persistence area 640 as an initial population set that moves (e.g., falls down) from the persistence area 640 and locks into specific portions (e.g., cells) of a feature-game array 930. The feature-game array 930 is different from the base-game array 230. For example, in response to occurrence of the trigger for the feature game (e.g., at processing block 314), the game-logic circuitry presents a cleared version of the feature-game array 930 (i.e., cleared of any symbols). In one embodiment, the game-logic circuitry clears the base-game array 230 of all symbols, and temporarily utilizes the cleared base-game array 230 as the feature-game array 930, which is similarly shaped or structured as the base-game array 230 (e.g., a rectangular shaped array, a 5×3 array structure, etc.). As shown in FIG. 9, the game-logic circuitry randomly selects, as the initial population set, a specific number of persisted value-bearing symbols (e.g., 3-15 persisted value-bearing symbols), such as the set of persisted value-bearing symbols 724, 733, 741, and 743. The game-logic circuitry randomly selects the members of the initial population set from any of the tiered persistence elements (e.g., from any of the queues 646, 647, or 648), and causes, via animation of a population effect, the members of the initial population set to be moved (e.g., caused to fall down) from the persistence area 640 to locked positions within the cells of the feature-game array 930. In one embodiment, the game-logic circuitry locks the members of the initial population set into any of the cells of the feature-game array 930 (e.g., randomly selects the cell locations), regardless of where the members of initial population set were located within the persistence area 640. In other embodiments, however, the game-logic circuitry can select cells of the feature-game array 940 (for positions of at least some of the initial population set) based on locations of the members of the initial population set (e.g., the game-logic circuitry can lock the randomly selected persisted value-bearing symbols into specific cell locations (e.g., at intersections of respective ones of rows 920, 922, and 924 and columns 910, 912, 914, 916, and 918 of the feature-game array 930) that match the original locations of the members of the initial population set (e.g., at intersections of the rows/queues 646, 647, and 648 and columns 641, 642, 643, 644, and 645 of the persistence area 640).

Referring back to FIG. 4, the flow 400 continues, at processing block 404, where the game-logic circuitry sets a replenishing spin counter (e.g., a count-down tracker) to a maximum value. For example, the game-logic circuitry sets the spin counter to a maximum value of three spins (e.g., see spin counter 902). The game-logic circuitry can later (e.g., within the loop beginning at processing block 406) decrement the spin counter (e.g., see processing block 410) or reset the spin counter to the maximum value (e.g., at processing block 414) based on whether any additional value-bearing symbols are locked into the feature-game array in response to a feature-game spin (e.g., see processing block 408).

The flow 400 continues, at processing block 406, where the game-logic circuitry begins a loop. Each instance of the loop occurs for each spin of the hold-and-spin feature game. The loop includes the processing blocks 408 through 418 and either repeats at processing block 418 or ends based on whether termination criteria for the loop has been met or not (e.g., termination criteria can include terminating the loop if either (a) a specific winning event occurs (e.g., if the feature-game array is filled at processing block 416) or (b) if the spin counter counts down to zero (e.g., based on decrementing at processing block 410). The loop begins with a first of the bonus spins. The loop ends after a last bonus spin completes, for example when termination criteria is met.

Figure 10:
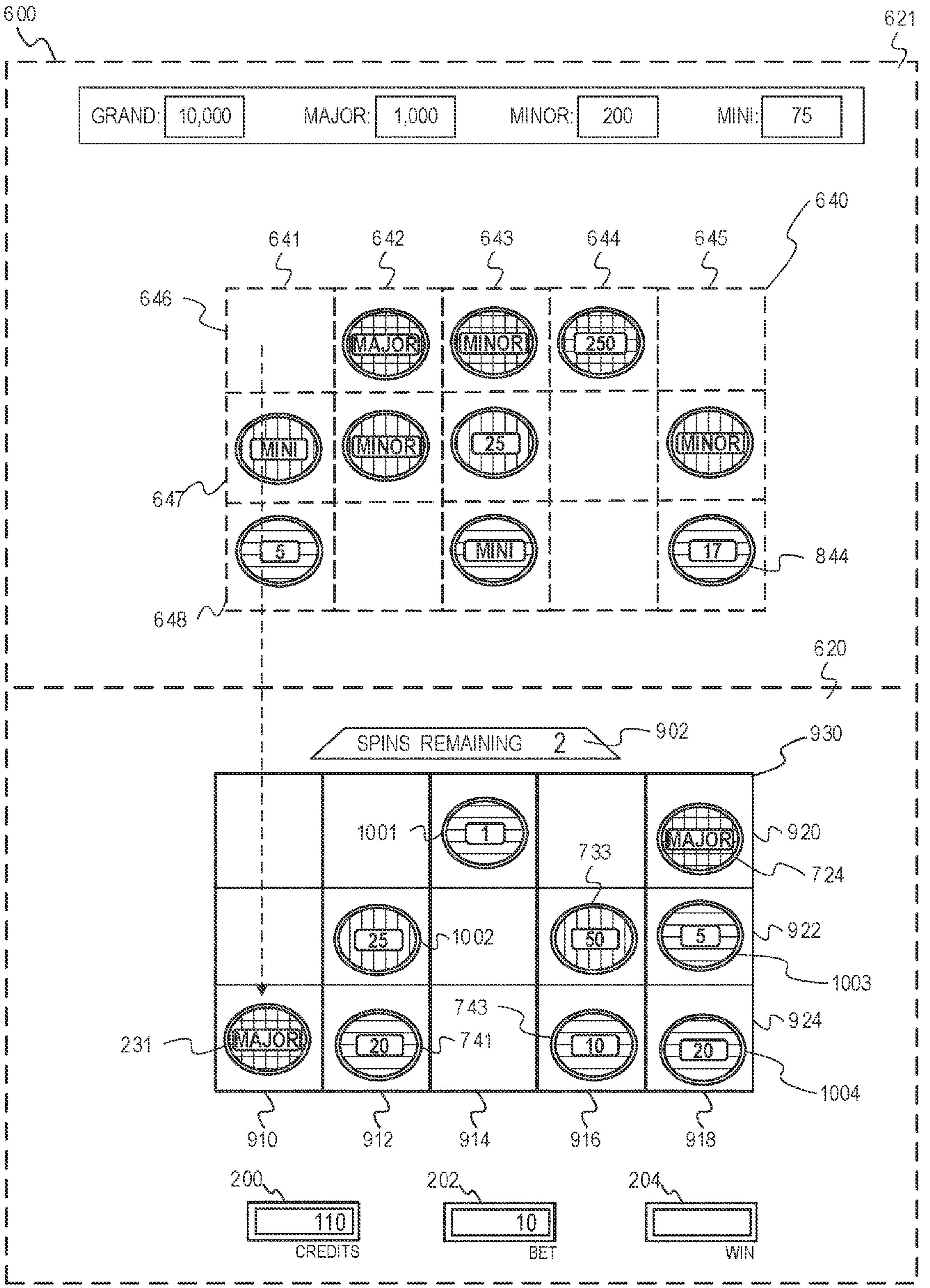

The flow 400 continues, at processing block 408, where the game-logic circuitry determines whether any additional value-bearing symbols are randomly added to (e.g. locked into) the feature-game array in response to a spin of the feature game. The game-logic circuitry can randomly add and lock additional value-bearing symbols in a variety of ways. For example, the game-logic circuitry can, in response to a feature-game spin, randomly generate, present (within the feature-game array), and lock (into cells of the feature-game array) additional value-bearing symbols. In another example, the game-logic circuitry can, in response to a feature-game spin, randomly select additional population sets (e.g., 1 persisted value-bearing symbol or more) from a remaining portion of the persisted value-bearing symbols in the persistence area (regardless of tier rank) to lock into one or more cells of the feature-game array. For example, FIG. 10 illustrates a state of the hold-and-spin feature game in response to a first feature-game spin. Referring to FIG. 10, the game-logic circuitry automatically generates (via the RNG), the additional value-bearing symbols 1001, 1002, 1003, and 1004 and locks them into specific cells of the feature-game array 930. Furthermore, the game-logic circuitry randomly selects an additional population set (e.g., the persisted value-bearing symbol 231) and locks the additional population set (e.g., the persisted value-bearing symbol 231) into one or more positions within one or more cells of the feature-game array 930. In some embodiments, the additional populations sets can be randomly selected in response to the feature-game spin. In other embodiments, the additional populations sets can be randomly selected at any time during feature-game play. For example, the game-logic circuitry can, at any time during the hold-and-spin feature game, randomly select from the remaining portion of the persisted value-bearing symbols in the persistence area 640, including after a last spin, such as a last chance to add locked value-bearing symbols (e.g., to complete a blackout of) the feature-game array 930.

Referring back to FIG. 4, if, at processing block 408, no additional tiered value-bearing symbol are added to the feature-game array, then the flow 400 continues, at processing block 410, where the game-logic circuitry decrements the spin counter (e.g., spin counter 902 is decremented by one). Referring again to processing block 408, if the game-logic circuitry determines an additional value-bearing symbol is added to the feature-game array, then the flow 400 continues at processing block 414 were the game-logic circuitry resets the spin counter back to the maximum number of spins (e.g., resets the count-down back to 3 spins). For example, referring to FIG. 10, because the persisted value-bearing symbol 231 was added (as an additional population set) to the feature-game array 930, then, on an immediately subsequent spin for the feature game, the game-logic circuitry would reset the spin counter 902 back to the example maximum value (e.g., three (3) spins).

Figure 11:
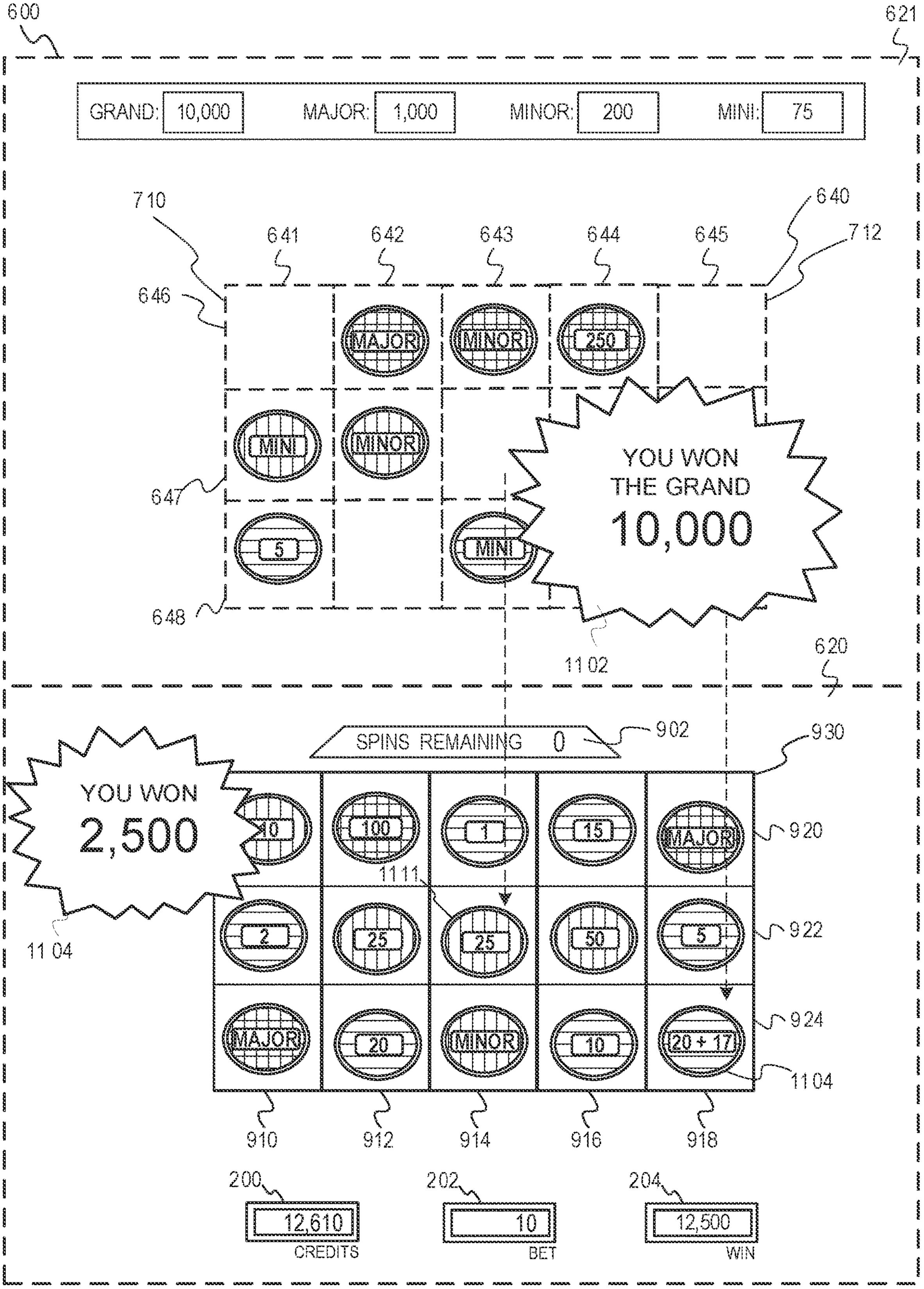
Figure 12:
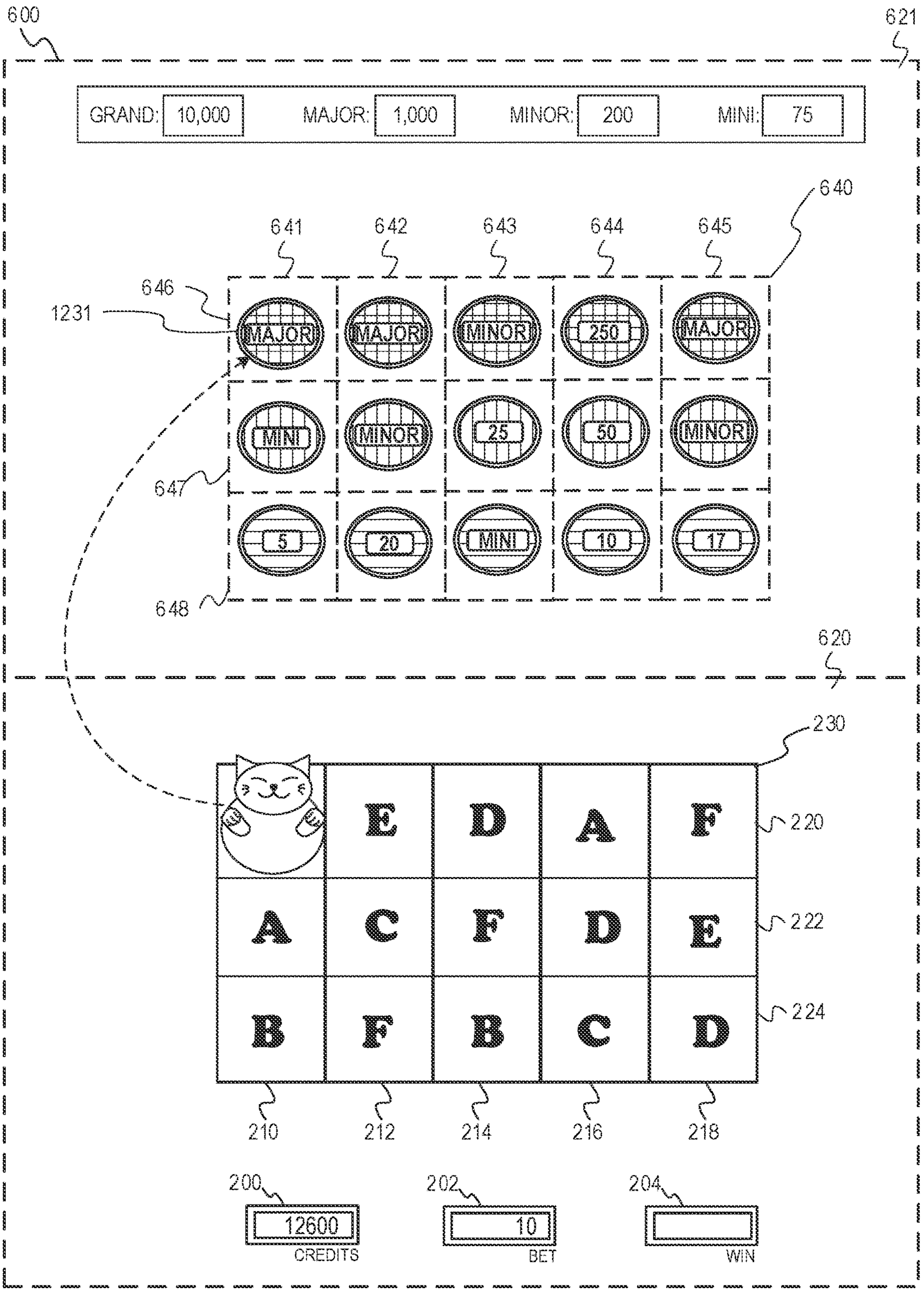
FIGS. 12-17 are an exemplary representation of a picking feature according to an embodiment of the present disclosure.

Referring back to FIG. 4, the flow 400 continues at processing block 416 where the game-logic circuitry determines whether the feature-game array is filled. For example, FIG. 11 illustrates the hold-and-spin feature game after several spins have occurred, and the spin counter 902 has counted down (e.g., to zero). The game-logic circuitry randomly drops two additional persisted value-bearing symbols (i.e., value-bearing symbol 1111 and value-bearing symbol 844) into two cells of the feature game array 930. The value-bearing symbol 111 falls into a final empty cell. The value-bearing symbol 844, however, falls into a cell already occupied by the locked value-bearing symbol 1004 (see FIG. 10). Thus, the game-logic circuitry merges the values of the already locked value-bearing symbol 1004 with the value of the dropped value-bearing symbol 844, forming a merged, locked value-bearing symbol 1104. The merged, locked value-bearing symbol 1104 can show the added merged values as a numerical value (e.g., "37"), as a textual expression (e.g., "20+17"), or in another way. In some embodiments, only value-bearing symbols of the same tier level can merge. In other embodiments, however, value-bearing symbols of different tiers can also merge. In the case of merging different tiered value-bearing symbols, the game-logic circuitry can cause the merged, locked value-bearing symbol to take on the tier indicator (e.g., the color) of the higher tiered one of the merged value-bearing symbols. The game-logic circuitry then detects that the feature-game array 930 is filled (i.e., is a blackout).

Referring back to FIG. 4, at processing block 418, if the feature-game array 930 is detected to be filled (e.g., as in FIG. 11), or if the spin counter reaches zero spins left (e.g., also as in FIG. 11), then loop ends and the flow 400 continues at processing block 420, where the game-logic circuitry awards a prize based on the number of locked value-bearing symbols. The game-logic circuitry awards, as at least part of the prize, a sum of credit values of all locked value-bearing symbols (e.g., as shown in FIG. 11, the sum of all locked value-bearing symbols is "2500" credits, as indicated in message 1104). If the blackout is detected, then the game-logic circuitry awards an additional prize (e.g., the GRAND progressive, as shown as shown in message 1102). A total amount won is shown in the win meter 204, which shows the total win amount of the GRAND combined with the total value of all locked value-bearing symbols (e.g., a total of "12,500" credits). The won amount is further reflected in credit meter 200.

The flow 400 continues at processing block 422, where the game-logic circuitry repopulates the persistence area with randomly generated tiered value-bearing symbols, and the flow 400 continues to processing block 424. For example, the game-logic circuitry fills any empty spaces within the tiered persistence elements that occurred from population sets being randomly selected and moved (e.g., the game-logic circuitry fills any empty spaces that are in queues 646, 647, and 648 caused by fallen/dropped persisted value-bearing symbols). The game-logic circuitry randomly generates new value-bearing symbols to fill the empty spaces. Each new randomly generated value-bearing symbol is a tiered value-bearing symbol, with tier indicators that match the tiers of persistence elements in which they are respectively placed.

Figure 13:
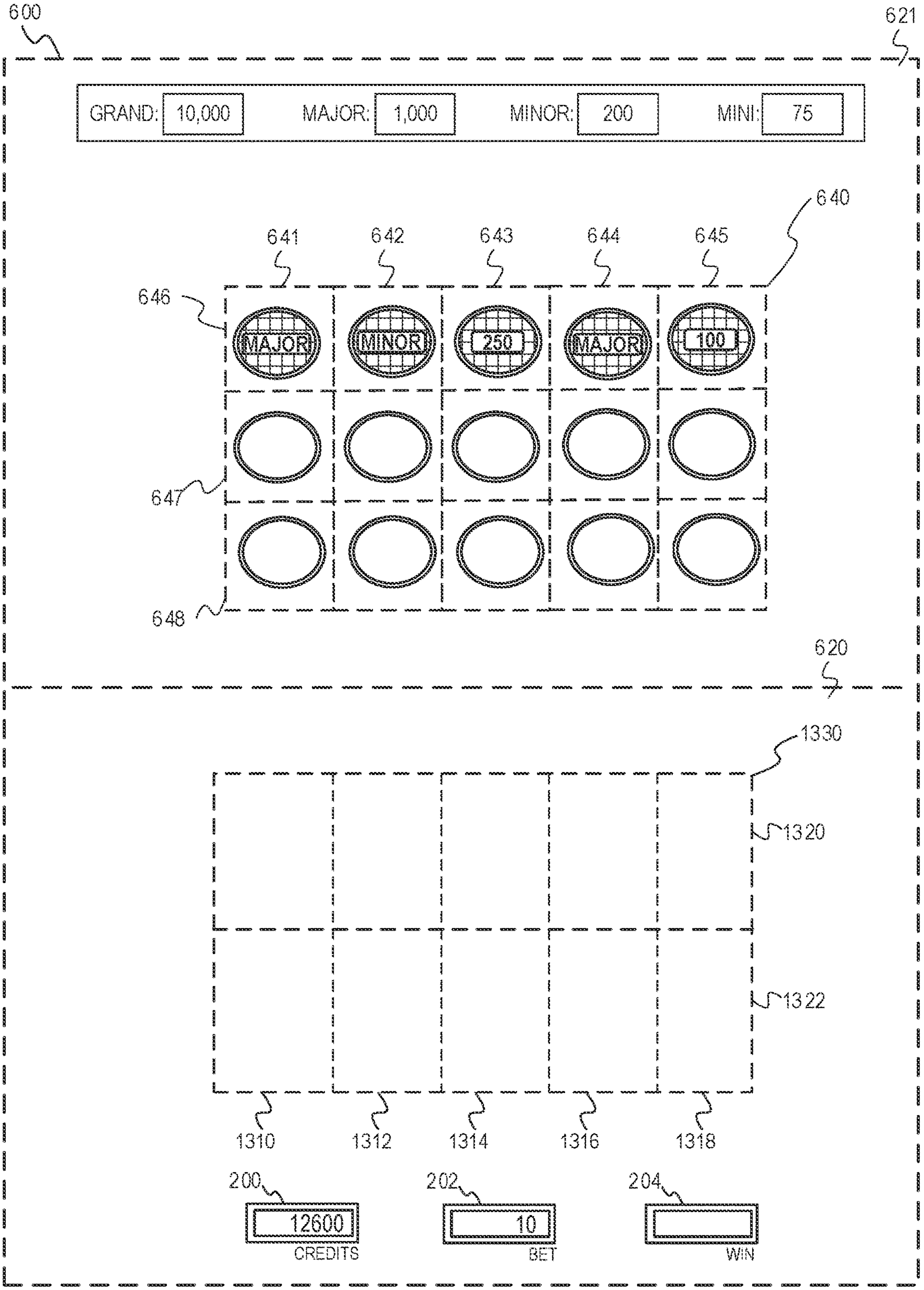

Referring now to FIG. 5, flow 500 begins at processing block 501 (i.e., from processing block 325), then continues to processing block 502, where the game-logic circuitry selects, based on the RNG, a set of persisted value-bearing symbols from a tiered persistence element. For example, in FIG. 12 a value-bearing symbol 1231 appears in the base-game array 230 and flies up to the persistence area 640. The value-bearing symbol 1231 is a GOLD tiered value-bearing symbol, hence it enters the queue 646 associated with the GOLD tier. The game-logic circuitry then detects (e.g., see processing block 316) that a picking game feature is triggered. Consequently, as shown in FIG. 13, the game-logic circuitry selects the set of persisted value-bearing symbols in the queue 646 (and optionally grays out, removes from view, or otherwise obscures the values on the other sets of persisted value-bearing symbols in the other queues 647 and 648). Furthermore, the game-logic circuitry prepares a picking feature game array (array 1330) having (at least) two rows 1320 and 1322. A first row 1320 will be for placement of concealed and shuffled versions of the set of persisted value-bearing symbols in the queue 646. A second row 1322 will be for placement of randomly generated modifier symbols (e.g., see modifier symbols in row 1322 in FIG. 14). Examples of modifier symbols include multipliers, extra picks, extra credit amounts, etc.

Figure 14:
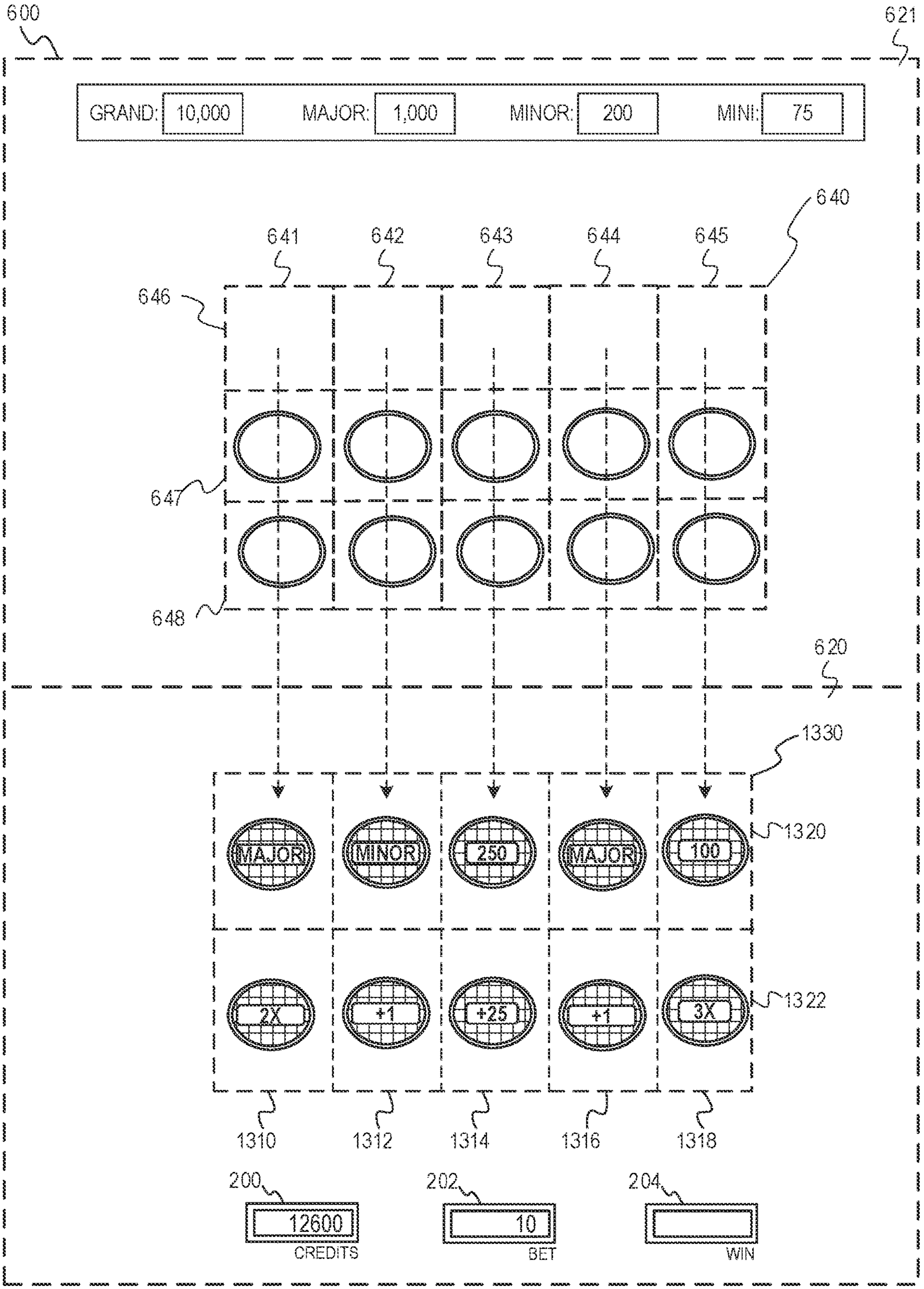
Figure 15:
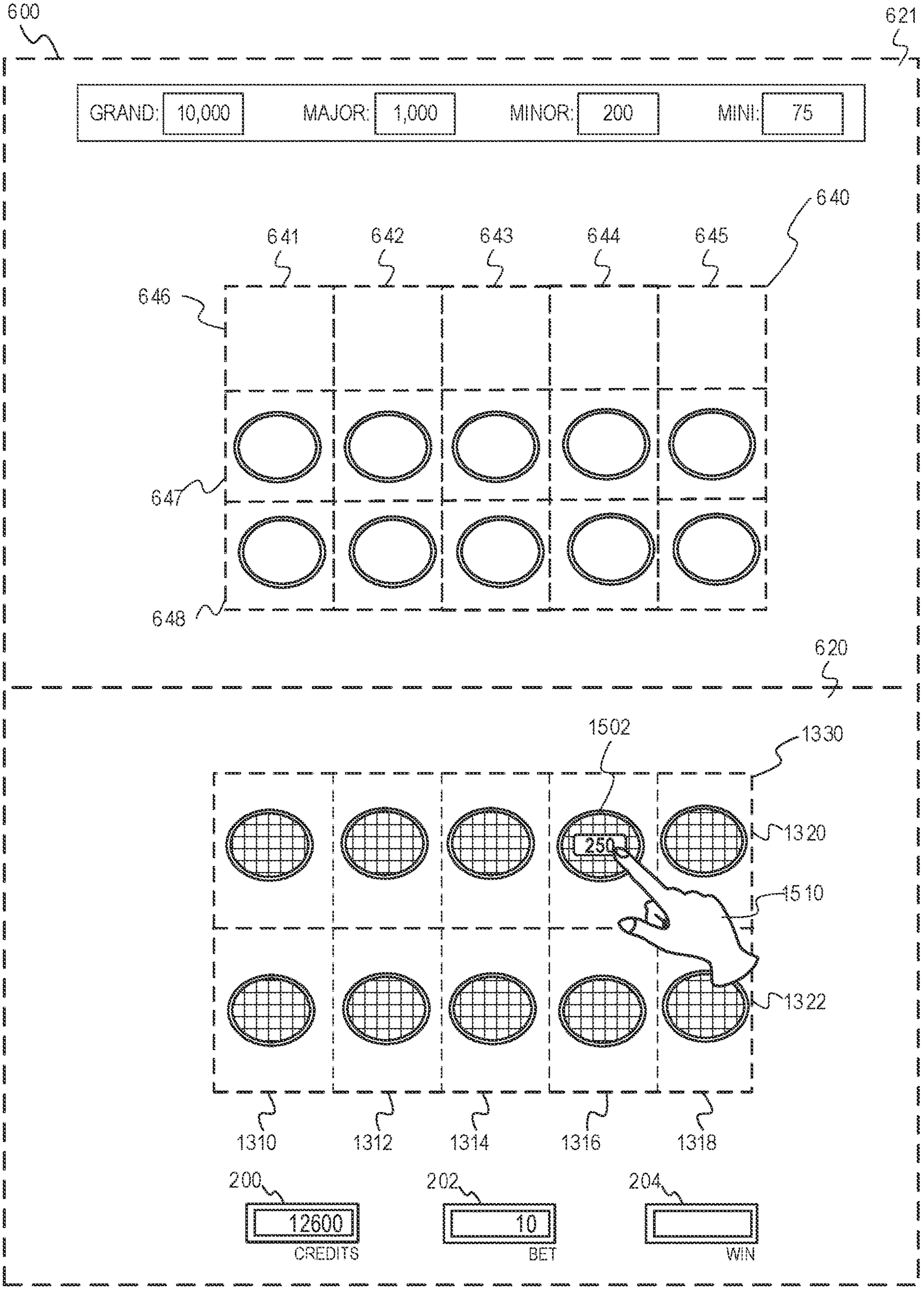

Referring momentarily back to FIG. 5, the flow 500 continues at processing block 504, where the game-logic circuitry conceals values presented on the selected set of persisted value-bearing symbols. Further, at processing block 506, the game-logic circuitry presents the selected set of persisted value-bearing symbols in first portion of feature-game array and shuffles physical positions of members of the selected set. Furthermore, at processing block 508, the game-logic circuitry presents, within a second portion of the feature-game array, a plurality of modifier symbols having modifier values concealed from view. For example, as shown in FIG. 14, the game-logic circuitry drops the selected set of persisted value-bearing symbols into the first row 1320 of the array 1330 (e.g., into cells of columns 1310, 1312, 1314, 1316, and 1318, which correspond to columns 641, 642, 643, 644, and 645). Furthermore, the game-logic circuitry randomly generates and presents modifier symbols in the second row 1322. Then, as illustrated in FIG. 15, the values of the set of selected value-bearing symbols in the first row 1320 are concealed, and their physical positions are randomly shuffled within the first row 1320. The values on the modifier symbols are also concealed and their physical positions are also randomly shuffled within the second row 1322.

Figure 16:
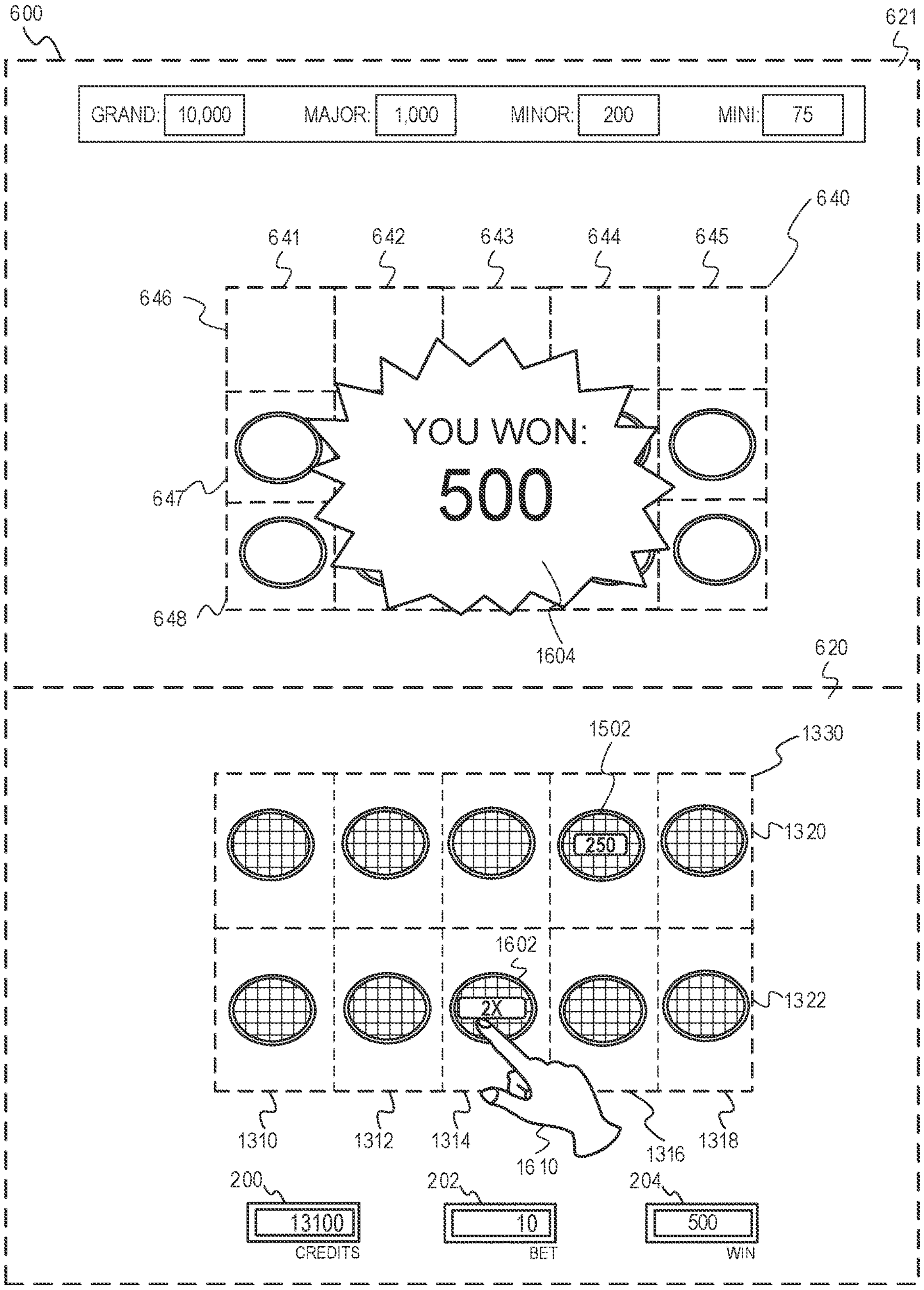

Referring momentarily back to FIG. 5, the flow 500 continues at processing block 510, where the game-logic circuitry determines whether first user input is received for a pick from the first portion of the feature-game array (determines whether a first pick occurs). If the first pick is detected, then, at processing block 512, the game-logic circuitry reveals the previously concealed credit value of the picked value-bearing symbol. Further, at processing block 514, the game-logic circuitry determines whether second user input is received for a pick from the second portion of the feature-game array (determines whether a second pick occurs). If so, then at processing block 516, the game-logic circuitry reveals the previously concealed modifier value for the picked modifier symbol. Then, at processing block 518, the game-logic circuitry applies the revealed modifier value to the revealed credit value and awards a prize accordingly. For example, in FIG. 15, the game-logic circuitry detects a first user input (e.g., via touch 1510 of a touch screen) of the value-bearing symbol 1502. The concealed value of the picked value-bearing symbol 1502 is revealed. Then, as illustrated in FIG. 16, the game-logic circuitry detects a second user input (e.g., via touch 1610) of the modifier symbol 1602. The concealed value of the picked modifier symbol 1602 is revealed. A prize is then awarded in the amount of the applied values (e.g., the credit value of "250." from value-bearing symbol 1502, is applied to the "2×" multiplier value on the modifier symbol 1602, resulting in a "500" credit value prize (as shown in message 1604 and in win meter 204, and which is reflected in credit meter 200).

Figure 17:
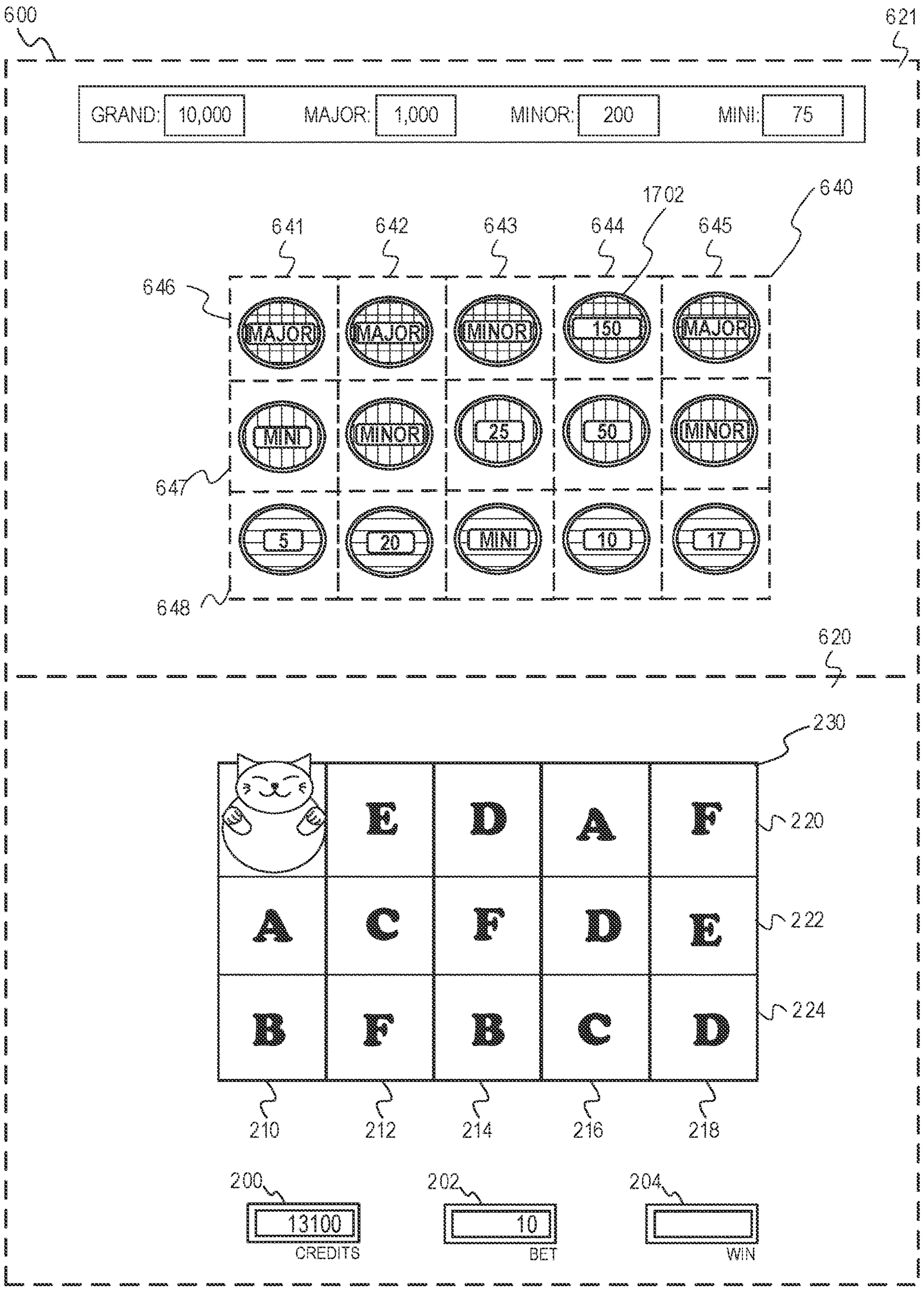

Referring back to FIG. 5, the flow 500 continues at processing block 519, where the game-logic circuitry repopulates the persistence area with a randomly generated tiered value-bearing symbol. For example, the game-logic circuitry fills the empty space within the persistence area caused when the value-bearing symbol was picked (by the first pick). For example, as shown in FIG. 17, the game-logic circuitry fills an empty spot in the queue 646 caused by the first pick with the randomly generated GOLD tiered value-bearing symbol 1702. The game-logic circuitry then restores the base-game array 230 to view for continued play of the base game.

In this description, numerous specific details are set forth. However, it is understood that embodiments of the invention may be practiced without these specific details. In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present disclosure can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising:

accepting, via a value input device, a physical item associated with a monetary value to establish a monetary balance;

presenting, by a presentation assembly, a plurality of symbol-bearing base-game reels that form a base-game array for a base game, the plurality of symbol-bearing base-game reels bearing a plurality of base-game symbols and a plurality of value-bearing symbols, each value-bearing symbol being associated with one of a plurality of tiers for a feature game;

conducting, by game-logic circuitry, the base game, wherein the base game includes operations that comprise:

conducting, by the game-logic circuitry via a random number generator, a series of spins of the plurality of symbol-bearing base-game reels for the base game, each spin including spinning and stopping the plurality of symbol-bearing base-game reels to randomly land at least some of the plurality of base-game symbols in the base-game array, wherein the series of spins lands randomly selected sets of value-bearing symbols from the plurality of value-bearing symbols;

animating, via the game-logic circuitry, persistence of at least some of the randomly selected sets of value-bearing symbols in corresponding ones of a plurality of tiered, revolving persistence elements presented in a feature-game persistence area, wherein the tiered, revolving persistence elements comprise tiered, first-in-first-out queues, wherein animating the persistence comprises accessing, from one or more memory locations, stored display coordinates for the tiered, first-in-first-out queues and using the stored display coordinates to render a revolving stream effect of persisted value-bearing symbols within the feature-game persistence area by executing a specific rendering algorithm, wherein said algorithm, in response to a new symbol asset, graphically shifts display coordinates of a plurality of pre-existing persisted symbol assets by one queue position and renders the new symbol asset in a first queue position, and wherein each of the plurality of tiered, revolving persistence elements corresponds to a respective one of the plurality of tiers;

determining, by the game-logic circuitry via the random number generator, a random trigger to present play of the feature game; and in response to determining the random trigger, using, by the game-logic circuitry, at least some persisted value-bearing symbols from the feature-game persistence area to populate one or more portions of a feature-game array.

2. The method of claim 1, wherein the randomly selected sets of value-bearing symbols are randomly selected, via use of the random number generator, for any of the plurality of tiers, and wherein odds for occurrence of the random trigger for the feature game increase when members of the randomly selected sets of value-bearing symbols are associated with different ones of the plurality of tiers.

3. The method of claim 1, wherein each value-bearing symbol is associated with the corresponding one of the plurality of tiers using a tier indicator comprising one or more of a color, a style, a shape, a text description, a special effect, a specific area, a physical arrangement, or a pattern.

4. The method of claim 1, wherein animating the persistence of at least some of the randomly selected sets of value-bearing symbols in the corresponding ones of the plurality of tiered, revolving persistence elements comprises:

animating, via the game-logic circuitry, a movement effect, wherein the movement effect moves each one of the at least some of the randomly selected sets of value-bearing symbols from the base-game array to the corresponding one of the plurality of tiered, revolving persistence elements presented in the feature-game persistence area; and in response to animating the movement effect, animating, via the game-logic circuitry, a revolving stream effect of at least a portion of persisted value-bearing symbols displayed within the corresponding one of the plurality of tiered, revolving persistence elements.

5. The method of claim 4, wherein the plurality of tiered, revolving persistence elements comprise tiered, first-in-first-out queues, wherein animating the movement effect causes any members of the at least some of the randomly selected sets of value-bearing symbols to enter corresponding ones of the tiered, first-in-first-out queues from a first side of the feature-game persistence area, and wherein animating the revolving stream effect comprises, in response to the any members of the at least some of the randomly selected sets of value-bearing symbols entering the corresponding ones of the tiered, first-in-first-out queues from the first side, animating, via the game-logic circuitry, movement of at least a portion of persisted value-bearing symbols in the corresponding ones of the queues to travel, by one queue position, from the first side toward a second side of the feature-game persistence area opposite to the first side.

6. The method of claim 5, further comprising:

animating, via the game-logic circuitry in response to the revolving stream effect, a merging effect, wherein the merging effect causes values, displayed on associated value-bearing symbols of a last persisted value-bearing symbol in at least one queue of the corresponding ones of the tiered, first-in-first-out queues and a second-to-last persisted value-bearing symbol in the at least one queue, to merge into a combined value, wherein the last persisted value-bearing symbol in the at least one queue is positioned adjacent to an edge of the second side; and animating, via the game-logic circuitry in response to the revolving stream effect, an exit effect, wherein the exit effect causes a last persisted value-bearing symbol in the at least one queue, positioned adjacent to the edge of the second side, to exit the at least one queue.

7. The method of claim 1, wherein in response to determining the random trigger, said method further comprising:

presenting, via the game-logic circuitry, the feature-game array;

randomly selecting, via the game-logic circuitry as the at least some of the persisted value-bearing symbols, an initial population set of persisted value-bearing symbols from any of the plurality of tiered, revolving persistence elements;

animating, via the game-logic circuitry, movement of the initial population set of persisted value-bearing symbols from the feature-game persistence area to the one or more portions of the feature-game array; and locking, via the game-logic circuitry, the initial population set of persisted value-bearing symbols into the one or more portions of the feature-game array.

8. The method of claim 7, further comprising, during an additional series of spins for the feature game, randomly generating, via the game-logic circuitry, additional value-bearing symbols for persistence within the feature-game array.

9. The method of claim 7, further comprising:

during an additional series of spins for the feature game, randomly selecting, via the game-logic circuitry, additional population sets of a remaining portion of persisted value-bearing symbols in the feature-game persistence area;

animating, via the game-logic circuitry, movement of the randomly selected additional population sets to lock into the feature-game array;

detecting, via the game-logic circuitry, that a selected value-bearing symbol of the remaining portion of persisted value-bearing symbols is randomly selected to be moved and locked into a cell of the feature-game array occupied by an already-locked value-bearing symbol in the cell; and merging, via the game-logic circuitry, a first value displayed on the selected value-bearing symbol, to a second value displayed on the already-locked value-bearing symbol.

10. The method of claim 1, wherein using the at least some persisted value-bearing symbols comprises randomly selecting, via the game-logic circuitry, the at least some persisted value-bearing symbols based on respective odds associated with the plurality of tiers.

11. The method of claim 1, wherein using the at least some persisted value-bearing symbols comprises animating, via the game-logic circuitry, movement of the at least some persisted value-bearing symbols from the feature-game persistence area to one or more empty positions within the feature-game array.

12. The method of claim 1, further comprising counting down, by the game-logic circuitry via a replenishing spin counter, an additional series of spins for the feature game from a maximum number of spins, wherein the replenishing spin counter decrements, during any additional spin for the feature game, if no additional value-bearing symbols populate the feature-game array during the additional spin; and wherein the replenishing spin counter resets to the maximum number of spins if additional value-bearing symbols populate the feature-game array during the additional spin.

13. The method of claim 12 further comprising awarding a prize for the feature game based on a number of value-bearing symbols locked into the feature-game array.

14. The method of claim 1, wherein the random trigger causes a picking feature associated with a set of persisted value-bearing symbols in one of the tiered, revolving persistence elements, said method further comprising:

concealing, via the game-logic circuitry, credit values of the set of persisted value-bearing symbols;

shuffling, via the game-logic circuitry, positions of the set of persisted value-bearing symbols within a first portion of the feature-game array;

presenting, via the game-logic circuitry, a set of modifier symbols within a second portion of the feature-game array;

concealing, via the game-logic circuitry, modifier values of the set of modifier symbols;

detecting, via the game-logic circuitry, a first pick, in response to first user input to the first portion of the feature-game array, of one of the shuffled set of persisted value-bearing symbols;

detecting, via the game-logic circuitry, a second pick, in response to second user input to the second portion of the feature-game array, of one of the set of modifier symbols;

revealing, via the game-logic circuitry, the concealed credit value of the picked one of the shuffled set of persisted value-bearing symbols and revealing the concealed modifier value of the picked one of the set of modifier symbols;

applying, via the game-logic circuitry, the revealed modifier value to the revealed credit value; and awarding, via the game-logic circuitry, a prize based on the revealed modifier value being applied to the revealed credit value.

15. The method of claim 1 further comprising, after the play of the feature game occurs, replacing, by the game-logic circuitry via use of the random number generator, any empty positions within the feature-game persistence area prior to subsequent play of the base game.

16. The method of claim 1, wherein the presentation assembly comprises a primary presentation device and a secondary presentation device, wherein the base-game array is presented on the primary presentation device, and wherein the feature-game persistence area is presented on the secondary presentation device; and wherein using, by the game-logic circuitry, the at least some persisted value-bearing symbols from the feature-game persistence area comprises:

maintaining, in the one or more memory locations, a data state for each of the at least some persisted value-bearing symbols, the data state defining first display coordinates on the secondary presentation device;

in response to determining the random trigger, updating the data state for each of the at least some persisted value-bearing symbols to define new, second display coordinates corresponding to the one or more portions of the feature-game array on the primary presentation device; and animating a movement effect of the at least some persisted value-bearing symbols from the first display coordinates to the second display coordinates based on the updated data state.

17. The method of claim 16, wherein the random trigger causes a picking feature associated with a set of the persisted value-bearing symbols maintained on the secondary presentation device, the method further comprising:

identifying, by the game-logic circuitry, the set of persisted value-bearing symbols associated with the picking feature;

animating movement of the identified set from the secondary presentation device to a first portion of the feature-game array on the primary presentation device;

concealing, via the game-logic circuitry, credit values associated with the identified set; and graphically shuffling, via the game-logic circuitry by updating display coordinates, positions of the identified set within the first portion of the feature-game array on the primary presentation device.

18. A gaming system comprising:

a value input device configured to execute first instructions that cause the gaming system to perform operations to accept a physical item associated with a monetary value to establish a monetary balance;

a presentation assembly configured to execute second instructions that cause the gaming system to perform operations to present a plurality of symbol-bearing base-game reels that form a base-game array for a base game, the plurality of symbol-bearing base-game reels bearing a plurality of base-game symbols and a plurality of value-bearing symbols, each value-bearing symbol being associated with one of a plurality of tiers for a feature game; and game-logic circuitry configured to execute third instructions that cause the gaming system to perform operations to:

conduct, via a random number generator, a series of spins of the plurality of symbol-bearing base-game reels for the base game, each spin including spinning and stopping the plurality of symbol-bearing base-game reels to randomly land at least some of the plurality of base-game symbols in the base-game array, wherein the series of spins lands randomly selected sets of value-bearing symbols from the plurality of value-bearing symbols;

animate persistence of at least some of the randomly selected sets of value-bearing symbols in corresponding ones of a plurality of tiered, revolving persistence elements presented in a feature-game persistence area, wherein the tiered, revolving persistence elements comprise tiered, first-in-first-out queues, wherein animation of the persistence comprises access, from one or more memory locations, of stored display coordinates for the tiered, first-in-first-out queues and use of the stored display coordinates to render a revolving stream effect of persisted value-bearing symbols within the feature-game persistence area by executing a specific rendering algorithm, wherein said algorithm, in response to a new symbol asset, graphically shifts display coordinates of a plurality of pre-existing persisted symbol assets by one queue position and renders the new symbol asset in a first queue position, and wherein each of the plurality of tiered, revolving persistence elements corresponds to a respective one of the plurality of tiers;

determine, via the random number generator, a random trigger to present play of the feature game; and in response to determination of the random trigger, use at least some persisted value-bearing symbols from the feature-game persistence area to populate one or more portions of a feature-game array.

19. The system of claim 18, wherein third instructions that cause the gaming system to perform operations to animate the persistence of at least some of the randomly selected sets of value-bearing symbols in the corresponding ones of the plurality of tiered, revolving persistence elements includes instructions, which when executed, that cause the gaming system to perform operations to:

animate, movement of each one of the at least some of the randomly selected sets of value-bearing symbols from the base-game array to the corresponding one of the plurality of tiered, revolving persistence elements presented in the feature-game persistence area; and in response to animation of the movement, animate a revolving stream of at least a portion of persisted value-bearing symbols displayed within the corresponding one of the plurality of tiered, revolving persistence elements.

20. The system of claim 19, wherein in response to determination of the random trigger, said game-logic circuitry further configured to execute instructions that cause the gaming system to perform operations to:

present the feature-game array;

randomly select, as the at least some of the persisted value-bearing symbols, an initial population set of persisted value-bearing symbols from any of the plurality of tiered, revolving persistence elements;

animate movement of the initial population set of persisted value-bearing symbols from the feature-game persistence area to the one or more portions of the feature-game array; and lock the initial population set into the one or more portions of the feature-game array.

* * * * *